(12) United States Patent
Nakano et al.

(10) Patent No.: US 7,233,850 B2
(45) Date of Patent: Jun. 19, 2007

(54) VEHICLE STEERING APPARATUS

(75) Inventors: Shirou Nakano, Osaka (JP); Sachio Yoshida, Osaka (JP); Ryouhei Hayama, Mie (JP)

(73) Assignee: Koyo Seiko Co., Ltd., Osaka (JP)

( * ) Notice: Subject to any disclaimer, the term of this patent is extended or adjusted under 35 U.S.C. 154(b) by 203 days.

(21) Appl. No.: 10/696,508

(22) Filed: Oct. 30, 2003

(65) Prior Publication Data

US 2004/0148078 A1    Jul. 29, 2004

(30) Foreign Application Priority Data

| Oct. 31, 2002 | (JP) | ............................ P.2002-318994 |
| Oct. 31, 2002 | (JP) | ............................ P.2002-318995 |
| Nov. 5, 2002 | (JP) | ............................ P.2002-321845 |
| Nov. 5, 2002 | (JP) | ............................ P.2002-321846 |

(51) Int. Cl.
 *A01B 69/00* (2006.01)
 *B62D 6/00* (2006.01)

(52) U.S. Cl. ..................... 701/41; 180/234; 180/410; 180/413

(58) Field of Classification Search ............ 701/41–43; 180/234, 410–413, 421, 443–446
See application file for complete search history.

(56) References Cited

U.S. PATENT DOCUMENTS

| 4,467,641 A | 8/1984 | Abraham |
| 4,862,486 A | 8/1989 | Wing et al. |
| 4,901,811 A * | 2/1990 | Uno et al. ................. 180/414 |
| 4,964,481 A * | 10/1990 | Sano et al. ................ 180/412 |
| 5,116,254 A * | 5/1992 | Sano et al. ................ 180/412 |
| 6,219,604 B1 | 4/2001 | Dilger et al. ................ 701/41 |
| 6,250,421 B1 | 6/2001 | Poshadlo |
| 6,397,127 B1 * | 5/2002 | Meyers et al. ................ 701/1 |
| 6,415,215 B1 * | 7/2002 | Nishizaki et al. ........... 701/70 |
| 6,802,226 B2 * | 10/2004 | Ono et al. ............ 73/862.325 |
| 2003/0055545 A1 * | 3/2003 | Uenuma et al. ............ 701/41 |
| 2004/0133324 A1 * | 7/2004 | Yasui et al. ................ 701/41 |

FOREIGN PATENT DOCUMENTS

| EP | 0 775 624 A2 | 11/1996 |
| EP | 1 201 528 A2 | 10/2001 |
| EP | 1 338 446 A2 | 8/2003 |
| JP | 10-324120 | 12/1998 |
| JP | 11-20427 | 1/1999 |
| JP | 2000-198453 | 7/2000 |

* cited by examiner

*Primary Examiner*—Gertrude A. Jeanglaude
(74) *Attorney, Agent, or Firm*—McGinn IP Law Group, PLLC

(57) ABSTRACT

An object of the present invention is to provide a vehicle steering apparatus that detects the tire load, and based on the detected tire load, performs steering control which accurately reflects the road conditions. A vehicle steering apparatus of the present invention includes a control unit 14, which controls a steering actuator in accordance with the operation of a steering wheel 1. An operation reaction force generated by a reaction force actuator 9 is applied to the steering wheel. Within the tire W, stress sensors SL and SR and an air pressure sensor SP are provided. The control unit 14 controls the steering actuator 2 and the reaction force actuator 9 with referring to the tire load detected by these sensors.

25 Claims, 10 Drawing Sheets

VEHICLE STEERING APPARATUS

BACKGROUND OF THE INVENTION

1. Field of the Invention

The present invention relates to a vehicle steering apparatus for providing a drive force of a steering actuator (such as an electric motor or a hydraulic cylinder) to a steering mechanism, such as a power steering apparatus or a steer-by-wire (SBW) system.

2. Description of the Related Art

Hitherto, a power steering apparatus constructed to transmit a drive force generated by an electric motor or a hydraulic cylinder to a steering mechanism for helping the steering operation is mounted to and used in a vehicle. For example, an electric power steering apparatus for transmitting a drive force of the electric motor via a gear mechanism to the steering mechanism or transmitting the same to the steering mechanism via a direct drive system is constructed in such a manner that a target value for driving the electric motor is set in accordance with a steering torque applied to a steering wheel, and the electric motor is controlled based on the set target value. The steering torque is detected by a torsion bar interposed between the steering wheel and the steering mechanism.

On the other hand, as a new vehicle steering apparatus, there is proposed a system in which a mechanical connection between the steering wheel and the steering mechanism for turning the steering tired-wheel is eliminated, and turning of the steering tired-wheel is achieved by detecting the operating angle of the steering wheel and, based on the detected results, providing a torque from the steering actuator to the steering mechanism (so called steer-by-wire (SBW) system. (See Patent Document 1 shown below).

The steering actuator is controlled by a control unit having a microcomputer. In other words, when the ignition switch of the vehicle is in an ON state, various detection signals of an operating angle sensor for detecting the operating angle of the steering wheel and a turning angle sensor for detecting the turning angle of the steering tired-wheel are input into the control unit. The control unit controls the steering actuator in such a manner that the turning angle of the steering tired-wheel corresponds to the operating angle of the steering wheel based on the input signals.

On the other hand, in order to provide an operation reaction force to a steering wheel, a reaction force actuator is provided on a steering shaft. The control unit provides the operation reaction force to the steering wheel by driving the reaction force actuator according to the operating angles and so on.

Reference documents relating to the present invention are shown below;

| | |
|---|---|
| [Patent Document 1] | JP-A-2000-198453 |
| [Patent Document 2] | JP-A-10-324120 |
| [Patent Document 3] | JP-A-11-20427 |

In the electronic power steering apparatus in the related art described above, the electric motor as a steering actuator is controlled according to the steering torque, and thus it can be said that the steering assistance according to the road conditions is performed as far as it is reflected to the steering torque. However, since the road conditions are reflected to the steering torque after being transmitted from the wheel through a mechanical link, detection may be delayed due to rattling or backrush of the steering mechanism, or torsion of a torsion bar, and thus delay of response in control cannot be avoided. That is, control of the steering actuator is not necessarily performed with a good responsibility.

In the same manner, in the steer-by-wire system as well, it is difficult to control the steering actuator while accurately reflecting the road conditions or other factors.

Accordingly, it is an object of the present invention to provide a vehicle steering apparatus, which is capable of detecting a load applied to the tire and performing steering control, in which the road conditions are accurately reflected, based on the detected load.

A fundamental factor for controlling the reaction force actuator (reaction force control) is to generate a self-aligning torque for reproducing a kickback from the road surface. Therefore, it is necessary to differentiate the setting for reaction force control for every individual vehicle, which causes elongation of the period of development.

More specifically, in the steer-by-wire system in which a steering gar and a handle column are not directly linked, the feedback of actual values of the axial force or a torque in the steering torque transmission system cannot be given to a driver via the steering wheel in contrast to the case of the normal-type steering mechanism in which the line from the steering wheel to the steering mechanism is mechanically linked. Therefore, the electrical feedback must be performed by converting the data on vehicle's behaviors into a self-aligning torque, or by controlling the reaction force actuator based on a torque of a pinion shaft that transmits a drive force of the steering actuator to a rack shaft. Therefore, in order to reproduce the self-aligning torque similar to the normal-type steering mechanism, vehicle adaptation technology for adjusting every individual vehicle is required.

In addition, in control of reaction force based on data of the vehicle's behavior or a torque of the pinion shaft, it is possible to transmit information on the road conditions (rutted road, cant road, wave road, snowy road) to the driver via the steering wheel. However, it is not possible to transmit transient information on the tire supporting surface (whether or not it is in the critical limit of grip). It is because information on the road condition is so called information in the low-frequency region, and thus it is sufficient when it is informed to the driver at a response speed in the order of 200 milliseconds, while transient information on the tire supporting surface have to be informed to the driver at a response speed in the order of several tens milliseconds for enabling the driver to take an appropriate reaction. However, in the reaction force control which is executed through a complex computing process based on data on the vehicle's behavior and so on, responsibility in the order of several tens milliseconds cannot be realized, and thus transient information on the tire supporting surface cannot be informed to the driver.

In addition, the driver uses consciously or unconsciously following information in order to drive a vehicle.

(1) Tire conditions (degree of wear: lowering of gripping force)

(2) Road conditions (slippery, irregular, wavy, rutted)

(3) Abnormality of vehicle, (abnormality, looseness, and wear of various parts in driving system or of underbody)

(4) Information received from traveling infrastructure

The driver senses such information visually, acoustically, or from vibrations of the seating surface and a reaction force generated when operating the operating terminals (such as steering wheel or control stick).

However, in the steer-by-wire system in which the steering gear and the handle column are not directly linked, in contrast to the normal-type steering mechanism in which the line from the steering wheel to the steering mechanism is mechanically linked, the feedback of the actual value of the axial force or the torque in the steering torque transmission system cannot be given to the driver via the steering wheel.

Therefore, transmission of information as described above to the driver tends to be insufficient. This is not a subject which is specific for the steer-by-wire system, but is a common subject in various technologies for improving the comfort or motility of vehicles (improving technology of a braking system, a driving system, and a suspension system in addition to the steer-by-wire technology), which may increase mental and physical stresses exerted to the driver during operation.

In view of such circumstances, it is an object of the present invention to provide the vehicle steering apparatus, which enables steering control in which the road conditions are accurately reflected based on the detected load applied to the tire. It is another object of the present invention to provide the vehicle steering apparatus in which application of the vehicle adaptation technology for every individual vehicle is reduced, so that the period of development can be shortened. It is a further object of the present invention is to provide the vehicle steering apparatus which realizes a reaction force control in which desirable transmission of transient information on tire supporting surface to the driver is achieved. It is one of the objects of the present invention is to provide the vehicle steering apparatus in which required information can be adequately informed to the driver and thus a comfortable driving environment is provided.

SUMMARY OF THE INVENTION

In order to achieve the objects described above, an aspect of the present invention is a vehicle steering apparatus including a steering mechanism (4,6,7,24) for turning a steerable tired-wheel (5,2,9), a steering actuator (2,32) for providing a steering force to the steering mechanism, a load detecting unit (SL, SR, SP, SA) for detecting a tire load, which is a load applied to a tire of a vehicle, and a steering control unit (14, C) for controlling the steering actuator according to the tire load detected by the load detecting unit. The reference numerals and signs in parentheses designate corresponding components in embodiments described later, hereinafter.

In this arrangement, since the steering actuator that provides a steering force to the steering mechanism is controlled by a load applied to the tire of the vehicle (the tire may be the one to be steered, or may be other tires), steering control which directly reflects the road conditions and the tire conditions is realized.

The load detecting unit is preferably detects a load applied to the tire within the tire. Accordingly, the road conditions, which are detected at the position nearest to the road surface, may be used for steering control, and thus steering control conformably following-up variations in road condition is achieved.

The load detecting unit may include an air pressure detecting unit (SP) for detecting the air pressure of the tire.

The load detecting unit may include a stress detecting unit (SL, SR) for detecting a stress applied to the tire.

In this case, the stress detecting unit preferably includes a left side stress detecting unit (SL) and a right side stress detecting unit (SR) for detecting stresses applied to the left side and the right side of the tire respectively when viewed toward the direction of travel of the vehicle. For example, the left side stress detecting unit and the right side stress detecting unit may be attached to the left side wall (52L) and the right side wall (52R) of the tire, respectively.

In this arrangement, since the degree of deformation of the tire occurred when the vehicle follows a curved track (when traveling along a curve) may be detected, adequate steering control according to the tire load is achieved.

Preferably, the invention further includes a steering direction detecting unit (13, 46) for detecting the steering direction of the vehicle, and the steering control unit controls the steering actuator based on the steering direction of the vehicle detected by the steering direction detecting unit and the stresses detected by the left side stress detecting unit and the right side stress detecting unit, respectively.

More specifically, the steering control unit preferably controls the steering actuator based on the steering direction of the vehicle detected by the steering direction detecting unit and the stresses applied on the outer portions of the tire when viewed in the direction of travel detected by the left side stress detecting unit and the right side stress detecting unit.

In this arrangement, the load applied on the tire may effectively be detected, utilizing the fact that the outer portions of tire of the vehicle when viewed in the direction of travel deform more than the center portion, and the detected results may be reflected to steering control.

In order to achieve the objects described above, another aspect of the present invention is a vehicle steering apparatus in which a steering mechanism for turning a steerable wheel (5, 29) is operated according to the operation of an operating member (1, 22) for steering a vehicle, including a reaction force actuator (9, 40) for providing an operation reaction force to the operating member, a load detecting unit (SL, SR, SP, SA) for detecting the tire load which is applied to the tire (W, WL, WR) of the vehicle, and a reaction force control unit (14, C) for controlling the reaction force actuator according to the tire load detected by the load detecting unit.

In this arrangement, since the reaction force actuator for providing an operation reaction force to the operating member is controlled according to a load applied to the tires of the vehicle (this may be the tire of the steerable tired-wheel or may be the tire of the wheel other than the steerable tired-wheel), control of the reaction force directly reflecting the road conditions and the tire conditions is achieved. Therefore, the kickback from the road surface can be reproduced without depending on the mechanical construction of the steering torque transmission system. Accordingly, necessity of adjustment for reaction force control for every individual vehicle, on which the vehicle steering apparatus is mounted, may be eliminated, and application of the vehicle adaptation technology may be reduced.

In addition, the reaction force actuator can be controlled at further superior responsibility in comparison with the case in which reaction force control is performed based on data on the vehicle's behavior and a torque of a pinion shaft. Therefore, not only low-frequency information corresponding to the road conditions, but also transient information of the tire supporting surface may be informed to the driver via the operating member by controlling the reaction force actuator. Accordingly, for example, even with a construction in which the operating member and the steering mechanism are not mechanically linked, same information as the normal-type steering mechanism can be provided via the operating member to the driver.

Preferably the load detecting unit is adapted to detect a load applied to the tire within the tire. The load detecting unit may include an air pressure detecting unit(SP) for detecting the air pressure of the tire.

The load detecting unit may also include a stress detecting unit (SL, SR, SA) for detecting a stress applied to the tire.

In this case, the stress detecting unit preferably includes the left side stress detecting unit (SL) and the right side stress detecting unit (SR) for detecting stresses applied to the left side and the right side of the tire respectively when viewed toward the direction of travel of the vehicle. For example, the left side stress detecting unit and the right side stress detecting unit may be attached to the left side wall (52L) and the right side wall (52R) of the tire, respectively.

In this arrangement, since the degree of deformation of the tire occurred when the vehicle follows a curved track (when traveling along a curve) may be detected, information on transient tire supporting surface can be obtained.

Preferably, the invention further includes the steering direction detecting unit (13, 46) for detecting the steering direction of the vehicle, and the reaction force control unit controls the reaction force actuator based on the steering direction of the vehicle detected by the steering direction detecting unit and the stresses detected by the left side stress detecting unit and the right side stress detecting unit, respectively.

More specifically, the reaction force control unit preferably controls the reaction force actuator based on the steering direction of the vehicle detected by the steering direction detecting unit and the stresses applied on the outer portions of the tire when viewed in the direction of travel detected by the left side stress detecting unit and the right side stress detecting unit.

In this arrangement, the load applied on the tire may effectively be detected utilizing the fact that the outer portions of the vehicle when viewed in the direction of travel deform more than the center portion, and the detected results may be reflected to reaction force control.

Another aspect of the present invention is a vehicle steering apparatus in which a steering mechanism (4, 6, 7, 24) for turning a steerable wheel (5, 29) to be steered is operated according to the operation of an operating member (1, 22) to be operated by a driver, including an actuator (9, 40) for applying a force to the operating member for transmitting information to the driver, at least one sensor (S1–S12) for detecting the physical amount relating to the movement of the vehicle and outputting the detection signal according to the detected result, a signal analyzing unit (14, C, A2) for supplying an analytical solution and a control unit (14) for controlling the actuator based on the analytical solution supplied from the signal analyzing unit.

In this arrangement, the results detected by the sensor for detecting the physical amount relating to the movement of the vehicle (including the physical amount of the operation of the operating member, the action of the steering mechanism, the action of the braking mechanism, the action of the driving system, and the tire load) are analyzed, and based on the analytical solution, the actuator is controlled. In other words, for example, the frequency property of the detection signal from the sensor is analyzed, and a force controlled according to the analysis is provided to the operating member. Accordingly, information relating to the movement of the vehicle can be transmitted through the operating member to the driver, and thus even when various technologies for improving the comfort or the motility of the vehicle (such as steer-by-wire) are employed, required information may be adequately informed to the driver.

The vehicle steering apparatus according to the present invention preferably includes a first determining unit (A11, A12) for determining whether or not the analytical solution analyzed by the signal analyzing unit conforms a predetermined first reference condition, a teaching unit (19, 70) for providing, when the analytic solution of the signal analyzing unit conforms the first reference condition (YES in A11, YES in A12), a teaching corresponding to the result of determination to the driver.

In this arrangement, when it is determined that the analytic solution (for example, frequency property) analyzed by the signal analyzing unit conforms the first reference condition, a teaching corresponding to the result of determination is given to the driver, and thus occurrence of abnormalities can be transmitted adequately to the driver.

The teaching unit may be the one which gives a teaching to the driver acoustically, or by illuminating a lamp or displaying a message.

The vehicle steering apparatus according to the present invention preferably includes a second determining unit (A11, A16) for determining whether or not the analytical solution analyzed by the signal analyzing unit conforms a predetermined second reference condition, and when the analytic solution of the signal analyzing unit is determined to conform the second reference condition (NO in A11, YES in A16), the control unit controls the actuator according to the analytic solution.

In this arrangement, when the analytic solution by the signal analyzing unit (for example, frequency property) conforms the predetermined second reference condition, the actuator is controlled by the analytic solution. Accordingly, when the analytic solution shows the presence of an abnormality, the actuator is controlled according to the degree of the abnormality, and thus occurrence of abnormalities can be transmitted via the operating member adequately to the driver.

Still another aspect of the present invention is a vehicle steering apparatus for operating a steering mechanism (4, 6, 7, 24) for turning a steerable tired-wheel (5, 29) according to the operation of an operating member (1, 22) to be operated by a driver, including an actuator (9, 40) for applying a force to the operating member for transmitting information to the driver, a load detecting unit (SL, SR, SP) for detecting the tire load which is a load to be applied to the tire of the vehicle, a steering mechanism system detecting unit (S3, S4, S12) for detecting the physical amount applied to the steering mechanism, a vehicle condition detecting unit (S5 to S11) for detecting the physical amount relating to the movement of the vehicle, a control unit (14, C) for controlling the actuator based on the result detected by at least one of the load detecting unit, the steering mechanism system detecting unit, and the vehicle condition detecting unit, and the teaching unit (19, 70) for giving a predetermined teaching to the driver based on the result detected by at least one of the load detecting unit, the steering mechanism system detecting unit, and the vehicle condition detecting unit.

In this arrangement, a steering reaction force (self-aligning torque or feeling of friction) informed to the driver from the operating member in the case of the vehicle steering apparatus, in which the line from the operating member to the steering mechanism is mechanically linked, can be informed to the driver via the operating member.

In addition, by controlling the actuator according to the physical amount relating to the movement of the vehicle (including the physical amount of the operation of the operating member, the action of the steering mechanism, the action of the braking mechanism, the action of the driving system, and the action of the suspension system), abnormalities of the mechanical system, abnormalities of control, or vibrations transmitted from the road surface (flutter, shimmy) can be informed to the driver via the operating member as a simulated reaction force. The simulated reaction force may be controlled by variable control according to the traveling conditions of the vehicle (such as vehicle speed, fore-and-aft acceleration, lateral acceleration, yaw rate, steering speed). An adjusting unit (75) for adjusting the magnitude of the simulated reaction force according to the preference of the driver may be provided.

In addition, by controlling the actuator according to a load applied to the tire of the vehicle (this may be the tire of the steerable tired-wheel or may be the tire of the wheel other than the steerable tired-wheel), reaction force control directly reflecting the road conditions and the tire conditions is achieved. Therefore, the kickback from the road surface can be reproduced without depending on the mechanical construction of the steering torque transmission system. Accordingly, necessity of adjustment for reaction force control for every individual vehicle, on which the vehicle steering apparatus is mounted, may be eliminated, and application of the vehicle adaptation technology may be reduced.

In addition, the actuator can be controlled at superior responsibility. Therefore, not only low-frequency information corresponding to the road conditions, but also transient information of the tire supporting surface may be informed to the driver via the operating member by controlling the actuator. Accordingly, for example, even with a construction in which the operating member and the steering mechanism are not mechanically linked, same information as the normal-type steering mechanism can be provided via the operating member to the driver.

In addition, according to the present invention, the teaching unit for providing a teaching to the driver based on the result detected by at least one of the load detecting unit, the steering mechanism system detecting unit, and the vehicle condition detecting unit. The teaching unit may be an information providing unit which informs the driver acoustically or visually, as the one providing a teaching to the, driver by generating a sound (sound warning), or the one giving a teaching to the driver by illuminating a lamp or by displaying a message.

For example, occurrence of abnormalities in mechanical system or in control, and generation of vibrations (such as flutter or shimmy) transmitted from the road surface may be informed to the driver by the teaching unit instead of controlling the operating member by the actuator or together with such control of the operating member. Alternatively, occurrence of abnormalities in mechanical system or in control, and generation of vibrations transmitted from the road surface may be selectively informed to the driver both by the simulated reaction force and the teaching unit, or by suitable one of those.

The load detecting unit is preferably detects a load applied to the tire within the tire.

The load detecting unit may also include the air pressure detecting unit (SP) for detecting the air pressure of the tire.

The load detecting unit may include the stress detecting unit (SL, SR, SA) for detecting a stress applied to the tire.

In this case, the stress detecting unit preferably includes the left side stress detecting unit (SL) and the right side stress detecting unit (SR) for detecting stresses applied to the left,side and the right side of the tire respectively when viewed toward the direction of travel of the vehicle. For example, the left side stress detecting unit and the right side stress detecting unit may be attached to the left side wall (52L) and the right side wall (52R) of the tire, respectively.

In this arrangement, since the degree of deformation of the tire occurred when the vehicle follows a curved track (when traveling along a curve) may be detected, transient information on the tire supporting surface may be obtained.

REFERENCE SIGNS IN THE DRAWINGS ARE AS FOLLOWS

Figure 1:
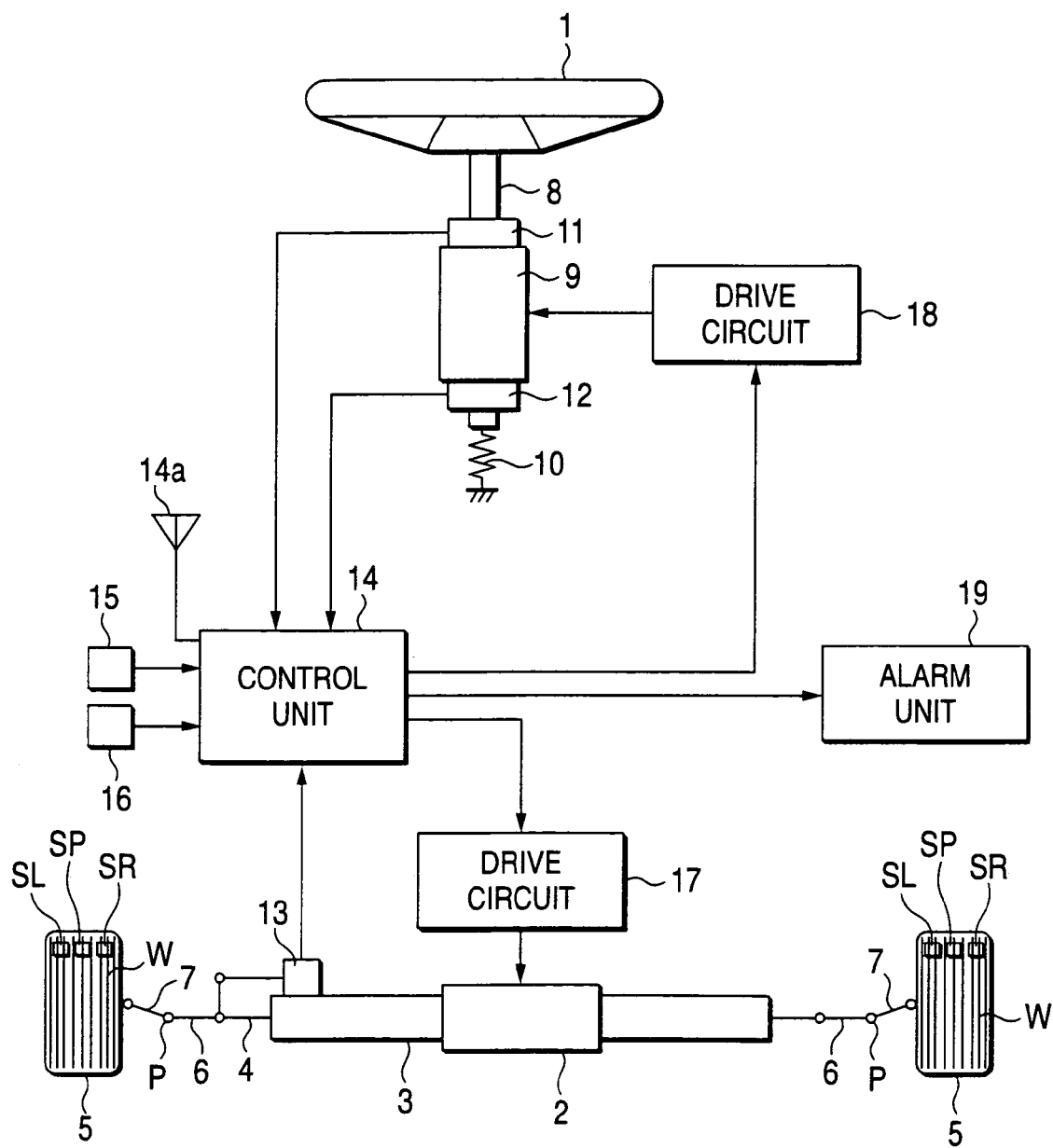
FIG. 1 is a conceptual drawing illustrating a construction of a vehicle steering apparatus according to a first embodiment of the present invention.

1: steering wheel; 2: steering actuator; 4: turning shaft; 5: steerable wheel; 9: reaction force actuator; 11: operating angle sensor; 12: torque sensor; 13: turning angle sensor; 14: control unit; 14*a*: antenna; 15: vehicle speed sensor; 17: drive circuit; 18: drive circuit; 19: alarm unit; 21: vehicle steering apparatus; 22: steering wheel; 24: steering mechanism; 26: planetary gear mechanism; 27: turning shaft; 27*a*: rack; 29: steerable wheel; 32: steering actuator; 34: pinion; 35: sun gear; 36; carrier; 37: planetary gear; 38: ring gear; 39: drive transmission gear; 40: reaction force actuator; 44: steering angle sensor; 45: torque sensor; 46: turning angle sensor; 47: vehicle speed sensor; 48: drive circuit; 51: tread portion; 52L: left side wall portion; 52R: right side wall portion;

REFERENCE SIGNS IN THE DRAWINGS ARE AS FOLLOWS

C: control unit; Ca : antenna; SA: stress sensor; SL: left side stress sensor: SP: air pressure sensor; SR: right side stress sensor; W: tire; WL: left tire; WR: right tire; S1: operating angle sensor; S2: torque sensor; S3, turning angle sensor; S4: axial force sensor; S5: vehicle speed sensor; S6: fore-and-aft acceleration sensor; S7; lateral acceleration sensor; S8: yaw rate sensor; S9: stroke sensor; S10: brake fluid sensor; S11: load sensor; S12: current detecting unit;

DETAILED DESCRIPTION OF THE PREFERRED EMBODIMENTS

Referring now to the attached drawings, embodiments of the present invention will be described.

<First Embodiment>

FIG. 1 is a conceptual drawing illustrating a construction of a vehicle steering apparatus according to a first embodiment of the present invention. The vehicle steering apparatus is a so-called steer-by-wire (SBW) system in which mechanical linkage between a steering wheel 1 and a steering mechanism is eliminated, and steering is achieved by converting the notion of a steering actuator 2 driven according to the rotary operation of the steering wheel 1 into a linear movement of a turning shaft 4 supported by a housing 3 in the widthwise direction of the vehicle, and converting in turn the linear movement of the turning shaft 4 into the turning movement of the front left and right steerable tired-wheels 5.

The steering actuator 2 includes an electric motor, such as a blushless motor. The drive force of the steering actuator 2 (rotational force of the output shaft) is converted into the linear movement of the turning shaft 4 in the axial direction (direction of the width of the vehicle) by a motion converting mechanism (for example, a ball screw mechanism) provided in relation to the turning shaft 4. The linear movement of the turning shaft 4 is transmitted to a tie-rod 6 provided projectingly from both ends of the turning shaft 4, and then causes rotation of a lo knuckle arm 7 coupled to a king pin P via the tie-rod 6, Accordingly, turning movement of the wheel 5 supported by the knuckle arm 7 is achieved. The turning shaft 4, the tie-rod 6, and the knuckle arm 7 constitutes a steering mechanism for turning the steerable tired-wheel 5.

The steering wheel 1 is linked to a revolving shaft 8 rotatably supported with respect to the vehicle body. The revolving shaft 8 is attached with a reaction force actuator 9 to provide an operation reaction force to the steering wheel 1. The reaction force actuator 9 includes an electric motor such as a blushless motor having an output shaft which is integral with the revolving shaft 8.

At an end of the revolving shaft 8 opposite from the steering wheel 1 is provided with a resilient member 10 constructed of spiral spring or the like connected to the vehicle body. The resilient member 10 restores the steering wheel 1 to the straight-ahead position by its resilient force when the reaction force actuator 9 is not applying a torque to the steering wheel 1.

In order to detect an operation input value of the steering wheel 1, an operating angle sensor 11 for detecting the operating angle of the steering wheel 1 relating to the revolving shaft 8 is provided. In addition, the revolving shaft 8 is provided with a torque sensor 12 for detecting the operating torque applied to the steering wheel 1. On the other hand, a turning angle sensor 13 for detecting the turning angle (tire angle) of the steerable tired-wheel 5 relating the turning shaft 4 is provided.

In addition, as described later, inside a tire W attached on the wheel 5, there are provided a left side stress sensor SL and a right side stress sensor SR for detecting stresses applied to the left and the right side walls of the tire W, and an air pressure sensor SP for detecting the air pressure of the tire W.

Detection signals supplied from the operating angle sensor 11, the torque sensor 12, the turning angle sensor 13, the stress sensor SL, SR, and the air pressure sensor SP are supplied to a control unit 14 constructed of an electric control unit (ECU) including a microcomputer. However, signals detected by the stress sensors SL, SR and the air pressure sensor SP are received by the control unit 14 via wireless communication via an antenna 14a.

The control unit 14 determines a steering instruction value based on the operating angle detected by the operating angle sensor 11, the turning angle detected by the turning angle sensor 13, the vehicle speed detected by a vehicle speed sensor 15, the stresses applied on the tire detected by the stress sensors SL, SR, and the air pressure of the tire detected by the air pressure sensor SP, and based on the steering instruction value, controls the steering actuator 2 via a drive circuit 17.

Since the steering wheel 1 and the steering mechanism are not mechanically linked, VGR (Variable Gear Ratio) function in which the amount of rotation of the steering wheel 1 and the amount of turn of the wheel 5 (transmission ratio, gear ratio) are variably set is achieved. In other words, for example, the control unit 14 sets the gear ratio based on the vehicle speed detected by the vehicle speed sensor 15 and the tire load detected by the stress sensors SL, SR and/or the air pressure sensor SP, and based on the gear ratio and the operating angle of the steering wheel 1, sets the steering instruction value corresponding to the voltage to be applied to the steering actuator 2.

On the other hand, the control unit 14 controls the reaction force actuator 9 via the drive circuit 18 based on the operating angle detected by the operating angle sensor 11, the operating torque detected by the torque sensor 12, the vehicle speed detected by the vehicle speed sensor 15, and the tire load detected by the stress sensors SL, SR and/or air pressure sensor SP so that an adequate reaction force is generated in the direction opposite to the operating direction of the steering wheel 1.

An alarm unit 19 provided, for example, on an instrument panel of the vehicle is connected to the control unit 14. The alarm unit 19 may be constructed of an alarm sound generating device or of an alarm display device providing an alarm display (lamp indication or message display). The control unit 14 generates an alarm from the alarm unit 19 when a predetermined abnormality that might require maintenance is detected.

Figure 2:
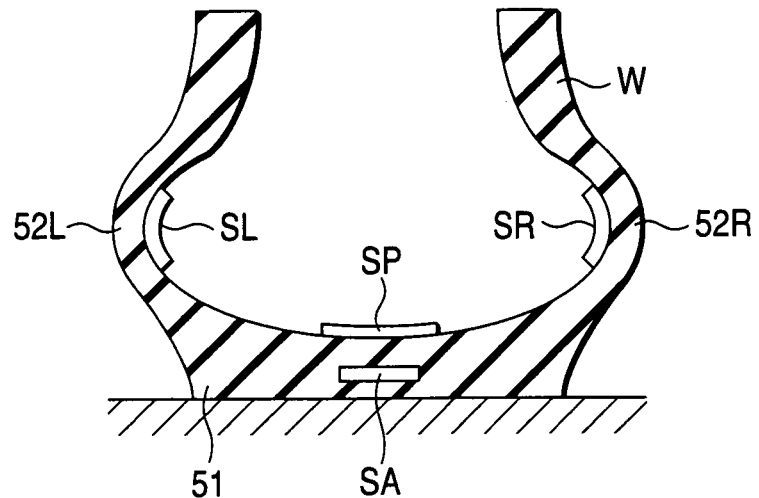
FIG. 2 is a diagrammatic cross-sectional view illustrating a construction of a tire of a steerable tired-wheel.

FIG. 2 is a diagrammatic cross-sectional view illustrating a construction of a tire W of a steerable tired-wheel 5. The tire W includes a tread portion 51 which comes into contact with the road surface and a pair of side wall portions 52L, 52R joined to both sides of the tread portion 51. The right side stress sensor SR is disposed on the inner wall surface of the side wall portion 52R on the right side when viewed toward the direction of travel of the vehicle, and the left side stress sensor SL is disposed on the inner wall surface of the side wall portion 52L on the left side when viewed toward the direction of travel of the vehicle. On the inner wall surface of the tread portion 51, there is disposed the air pressure sensor SP. Alternatively, for example, a stress sensor SA may be embedded in the tread portion 51.

The right side stress sensor SR and the left side stress sensor SL detect stresses applied to the right side wall portion 52R and the left side wall portion 52L respectively, and includes a sensor unit such as a strain gauge, a transponder unit for transmitting detection signals of the sensor unit by radio, and an electricity storing unit for converting the rotational movement of the tire W into an electric energy and storing the converted energy, so as to be operated by the electric energy stored in the electricity storing unit. Likewise, the air pressure sensor SP is disposed inside the tire W, and includes a sensor unit for detecting the internal air pressure of the tire W, the transponder unit for transmitting the detection signals of the sensor unit by radio, and the electricity storing unit for converting the rotational movement of the tire W into the electric energy, and storing the converted electric energy, so as to be operated by the stored electric energy. The signals emitted from the transponder unit is received by the control unit 14 via an antenna 14a.

The stress sensor and the air pressure sensor as described above may be those which is publicly known, such as ones disclosed in Patent Document 2 and Patent Document 2.

Figure 3A:
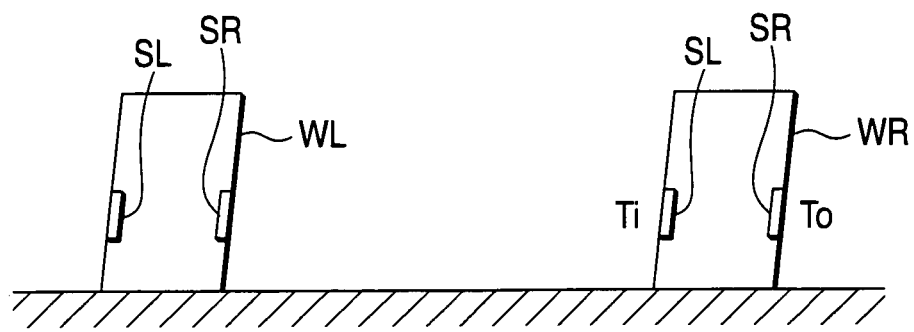
FIGS. 3A and 3B are diagrammatic drawings illustrating deformation of the tire at the time of cornering.
Figure 3B:
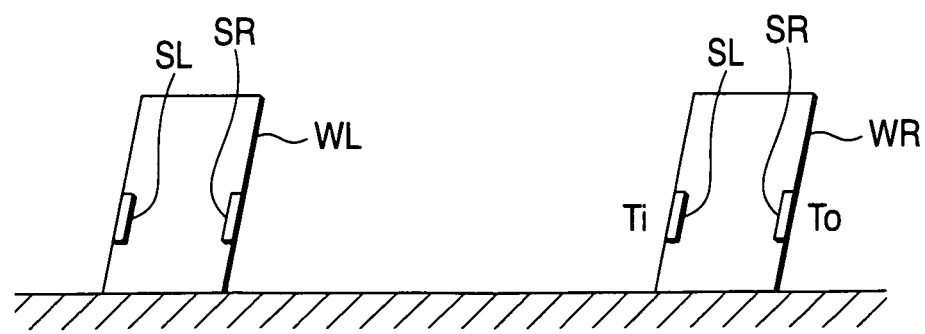

FIG. 3 is a diagrammatic drawing for illustrating deformation of the tire W at the time of cornering. FIG. 3A shows a cross sectional areas of left and right tires WL, WR in a case in which the vehicle is steered toward the left on the road surface which is relatively low in fractional coefficient, and FIG. 3B shows a cross sectional areas of the left and the right tires WL, WR in a case in which the vehicle is steered toward the left on the road surface which is relatively high in fractional coefficient. Both of FIG. 3A and FIG. 3B show the cross sectional areas of the tire WL, WR when viewed from the rear of the vehicle toward the direction of travel of the vehicle.

Deformation of the left tire WL out of the left and the right tires WL, WR, which is located on the inner side with respect to the steering direction, is relatively small, and deformation of the right tire WR which is located on the outer side with respect to the steering direction is relatively large. For both of the left and the right tires WL, WP, deformation on the left side wall portion, which is located on the inner side with respect to the steering direction, is smaller and deformation of the right side wall portion, which is located on the outer side with respect to the steering direction, is larger. Such deformation increases with the frictional coefficient of the road surface.

In the present embodiment, the control unit 14 identifies a tire, which is located on the outer side with respect to the steering direction, based on the output signal of the turning angle sensor 13, and refers the output of the left and the right stress sensors SL, SR mounted to the tire (in the example shown in FIG. 3, the right tire WR), More specifically, the difference ΔT between a stress To of the outer side wall portion detected by the right side stress sensor SR for detecting the stress of the right side wall portion 52R, which is located to the outer side with respect to the steering direction and a stress Ti of the inner side wall portion detected by the left side stress sensor SL for detecting the stress of the left side wall portion 52L, which is located on the inner side with respect to the steering direction is obtained (=To−Ti). Further, the control unit 14 obtains a first time derivative of the difference of stress ΔT of the left and the right side wall portions (stress variation speed, tire load variation speed) or a second time derivative (stress variation acceleration, tire load variation acceleration), and drives the steering actuator 2 and the reaction force actuator 9 based on the tire load variation speed or the tire load variation acceleration obtained in this manner.

Figure 4:
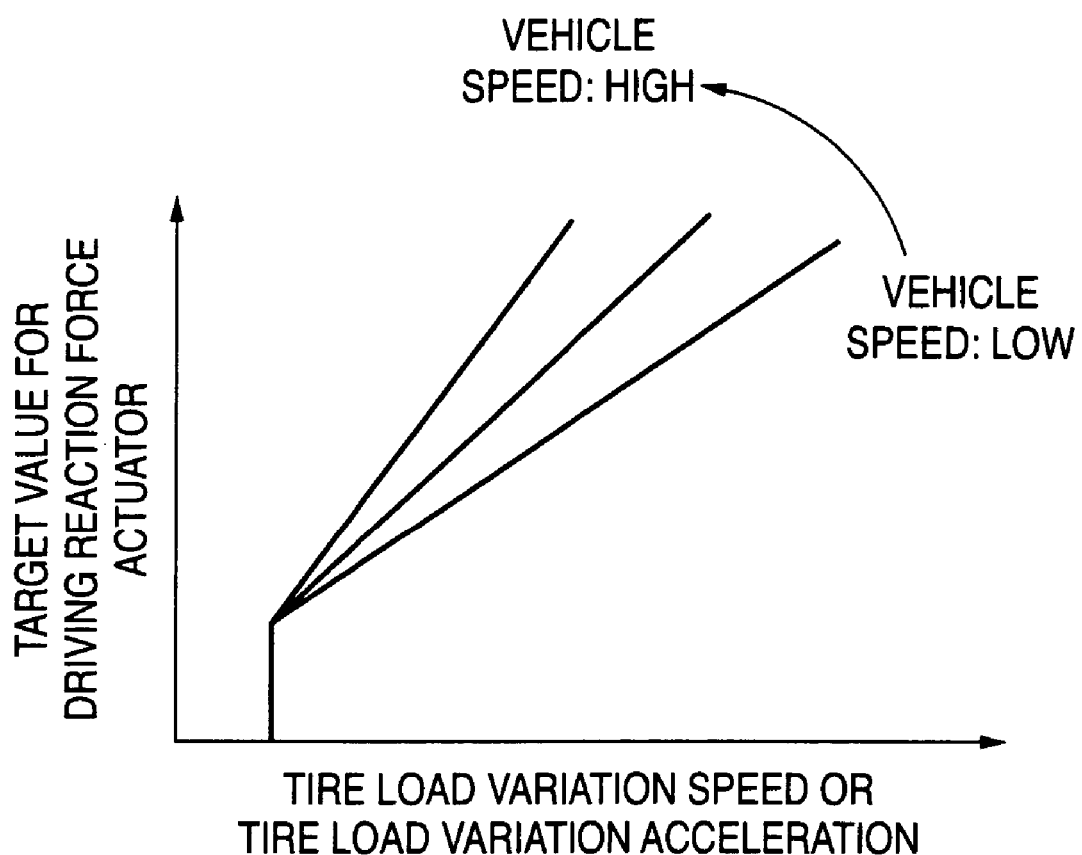
FIG. 4 is a control characteristic drawing showing an example of the control mode of a reaction force actuator.

FIG. 4 is a control characteristic drawing showing an example of the control mode of the reaction force actuator 9. The control unit 14 sets a target value for driving the reaction force actuator, which varies, for example, linearly within a certain region according to the tire load variation speed or the tire load variation acceleration in the tire on the outer side with respect to the steering direction, and supplies a control signal to the drive circuit 18 so that the target value for driving the reaction force actuator is achieved. In the characteristic drawing shown in FIG. 4, the target value for driving the reaction force actuator, which increases linearly with the tire load variation speed or the tire load variation acceleration for tire load variation speeds or tire load variation accelerations over a certain value, and the target value for driving the reaction force actuator to be set increases with the vehicle speed detected by the vehicle speed sensor 15.

Accordingly, the reaction force transmitted to the driver increases with the variation speed or the variation acceleration of the tire load, and the reaction force to be transmitted to the driver via the steering wheel 1 increases with the vehicle speed.

Figure 5:
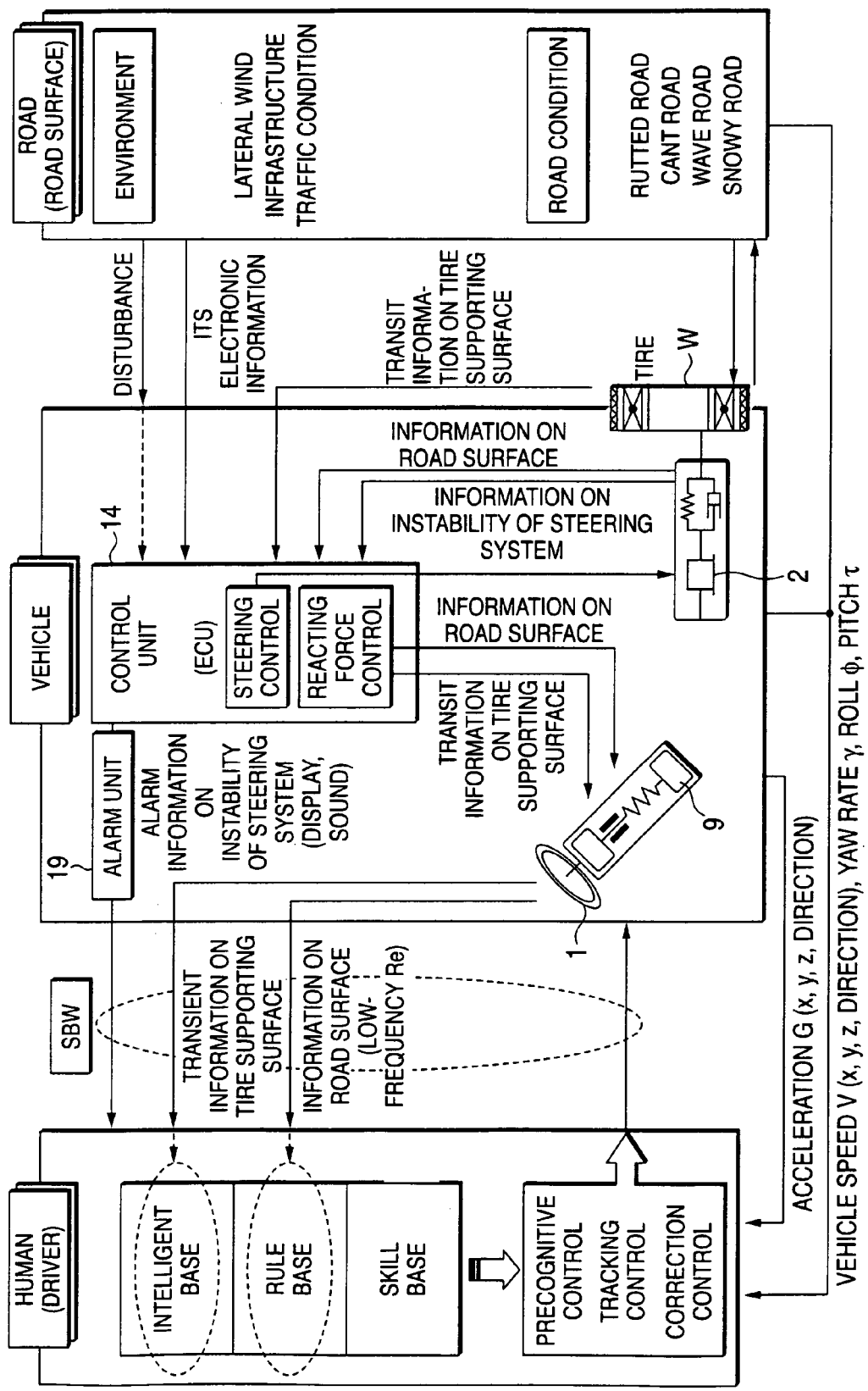
FIG. 5 is a conceptual drawing showing a state of giving and receiving information among a driver, a vehicle and the road surface.

FIG. 5 is a conceptual drawing showing a state of giving and receiving information among the driver, the vehicle and the road surface. For example, from the road surface, a disturbance such as lateral wind is exerted to the vehicle, and information such as traffic information is supplied, for example, as ITS (Intelligent Transport Systems) electronic information from an infrastructure disposed in the road traffic network to the vehicle. In addition, the road conditions such as rutted road, cant road, wave road, or snowy road are transmitted to the vehicle through the tire.

On the other hand, from the vehicle to the driver, information on the road conditions (low-frequency information) as well as transient information on the tire supporting surface described above are transmitted by control of the reaction force actuator 9 (reaction force control) by the control unit 14 (ECU: electronic control unit) via the steering wheel. In addition, information of instability of the steering system or alarm is informed to the driver by display or by sound through the alarm unit 19 described above.

The reaction force actuator 9 can inform information on the road surface, which is low-frequency information, to the driver via the steering wheel by being controlled based on the torque generated by the steering actuator 2 or the output of the turning angle sensor 13 simultaneously with such control, transient information on the tire supporting surface is informed to the driver via the steering wheel 1 by the reaction force actuator 9 being controlled according to the tire load variation speed or the tire load variation acceleration as described above.

Information on instability of the steering system, which is informed by the alarm unit 19, includes tire balance or occurrence of shimmy. Although such information may be informed to the driver via control of the reaction force actuator 9, it is more effective to inform visually or acoustically to the driver using the alarm unit 19 for urging the driver to perform maintenance.

The control unit 14 further controls the steering actuator 2 according to the output of the operating angle sensor 11 or the tire load detected by the stress sensors SL, SR and the air pressure sensor SP (steering control).

On the other hand, in addition to information informed by the alarm unit 19 or the steering wheel 1, the driver senses an acceleration G on the vehicle, and also senses the vehicle speed V, the yaw rate γ, the roll ϕ, and the pitch τ. Based on such information, the driver controls the steering wheel 1 for performing precognitive control, tracking control and correction control.

Precognitive control is a kind of control to be performed by the driver while forecasting the coming conditions. Tracking control is a kind of control to track a certain behavior of the vehicle which is intended by the driver as a target. Correction control is a kind of control to correct a disturbance such as lateral wind. These types of control are performed based on knowledge of the driver relating to the operation of the vehicle, and such knowledge may be classified into a knowledge based on the skill, a knowledge based on the rule, and a knowledge based on the intelligence.

The skill-based knowledge relating the operation is a knowledge taken by the body, that is, a knowledge that makes himself/herself act spontaneously based on information taken through five senses without consciousness. The rule-based knowledge relating the operation is a knowledge that makes himself/herself act according to the judgment (for example, whether or not certain conditions are conformed) based on the memory of the driver, that is, a knowledge relating to the patterned action. The intelligence-based knowledge relating to the operation is not a knowledge relating to the patterned action, but an advanced knowledge that makes himself/herself act through a thought which is conscious, abstract, and logical thought.

For example, road surface information informed to the driver via the steering wheel 1 as low-frequency information works with the driver's rule-based knowledge and urges him/her to perform the patterned driving action. In contrast, transient information on the tire supporting surface informed to the driver also via the steering wheel 1 works with the driver's intelligence-based knowledge and is used for an advanced determination (such as whether or not the vehicle is at the critical point where the steering torque is released).

In this manner, according to the present embodiment, the reaction force actuator 9 is controlled according to the tire load, which is directly detected by the lift and the right stress sensors SL, SE and the air pressure sensor SP attached on the tire. Therefore, since reaction force control can be preformed adequately without depending on the mechanical construction of the steering mechanism, application of the vehicle adaptation technology for differentiating reaction force control for every individual vehicle or type of vehicle may be reduced or eliminated. Accordingly, the period required for development of the vehicle steering apparatus may significantly be shortened.

Since the present invention is constructed to detect the condition of load applied to the tire W detected by the left and the right stress sensors SL, SR, and the air pressure sensor SP, and to perform reaction force control using the detected conditions, complicated computing process is not necessary, and thus the reaction force actuator 9 may be controlled with a high-speed responsibility in the order of several tens milliseconds. Therefore, transient information on the tire supporting surface such as the critical limit of grip can be informed to the driver via the steering wheel 1.

Figure 6:
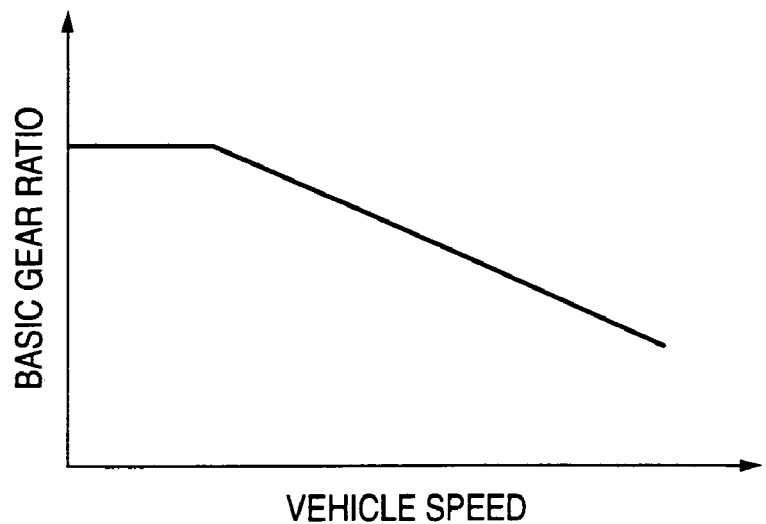
FIG. 6 is a characteristic drawing illustrating control of a steering actuator, showing an example of setting of a basic gear ratio according to the vehicle speed.

FIG. 6 is a characteristic drawing illustrating control of the steering actuator 2, showing an example of setting of a basic gear ratio according to the vehicle speed. As described above, in the steer-by-wire system, the gear ratio (turned amount/operated amount), which corresponds to the operated amount of the steering wheel 1 with respect to the turned amount of the tired-wheel 5 can be set as desired. Therefore, utilizing this characteristic, speed-sensitive variable gear ratio control may be performed. More specifically, in the low-speed region, the basic gear ratio is held at a constant value at a relatively high level, and in the middle-high speed region, the basic gear ratio is set to be decreased linearly with respect to increase of the vehicle speed.

Accordingly, when steering in the low-speed region, in which steering at large angles may be performed, the load of driver is alleviated, while in the middle-high speed region where steering at large angles are not to be performed, the amount of turn is reduced to prevent the vehicle from wobbling.

Figure 7:
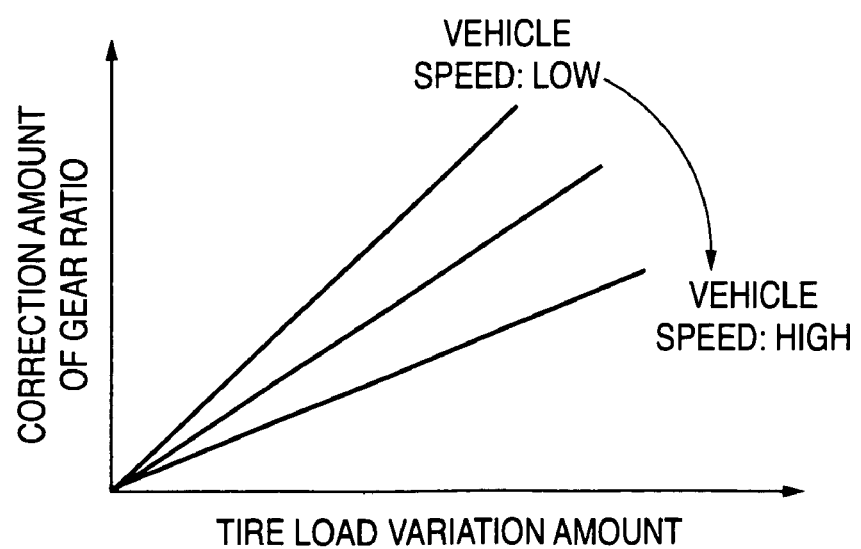
FIG. 7 is a characteristic drawing for correcting the gear ratio according to the tire load.

FIG. 7 is a characteristic drawing for correcting the gear ratio according to the tire load, and showing relation between the amount of gear ratio correction for correcting the basic gear ratio by adding the tire load and the amount of variation of the tire load (for example, the amount of variation of the tire load located on the outer side with respect to the steering direction).

The amount of variation of the tire load corresponds to the deviation with respect to the reference value, that is, the amount of the tire load (such as the air pressure, the stress, difference of stress between the left and the right side, walls of the tire) at the moment when the ignition switch of the vehicle is turned on and the control unit 14 is activated. The amount of variation of the tire load varies dynamically according to the road conditions or traveling conditions (such as traveling straight ahead, or traveling along a curve) while the vehicle is traveling. However, it is preferable that the amount of variation of the tire load represents an amount of variation of the tire load which is obtained by measuring for a relatively long period, such as an average of sampling, average of movement, or process value of low-pass filter per a predetermined period. Accordingly, control which is excessively sensitive to the amount of variation of the tire load is prevented.

In the example shown in FIG. 7, the correction amount of the gear ratio is set to increase with the amount of variation of the tire load. Therefore, by setting the basic gear ratio to a gear ratio corrected by the correction amount of the gear ratio (basic gear ratio+amount of correction of gear ratio), a suitable gear ratio corresponding to the tire load is achieved, and thus steerability of the vehicle is improved. In other words, improved operability of the steering wheel 1 under the condition in which the amount of variation of the tire load is significant (when traveling in mountains) is achieved.

In addition, in the example shown in FIG. 7, the correction amount of the gear ratio is set to decrease with increase in vehicle speed. Therefore, when the higher the vehicle speed, the lower the variations of the gear ratio according to the tire load becomes, and thus steering control which sensitively reflects the condition of the tire load may be performed in the low speed range, and steering stability may be achieved in the middle-high speed range by reducing variations of the gear ratio.

<Second Embodiment>

Figure 8:
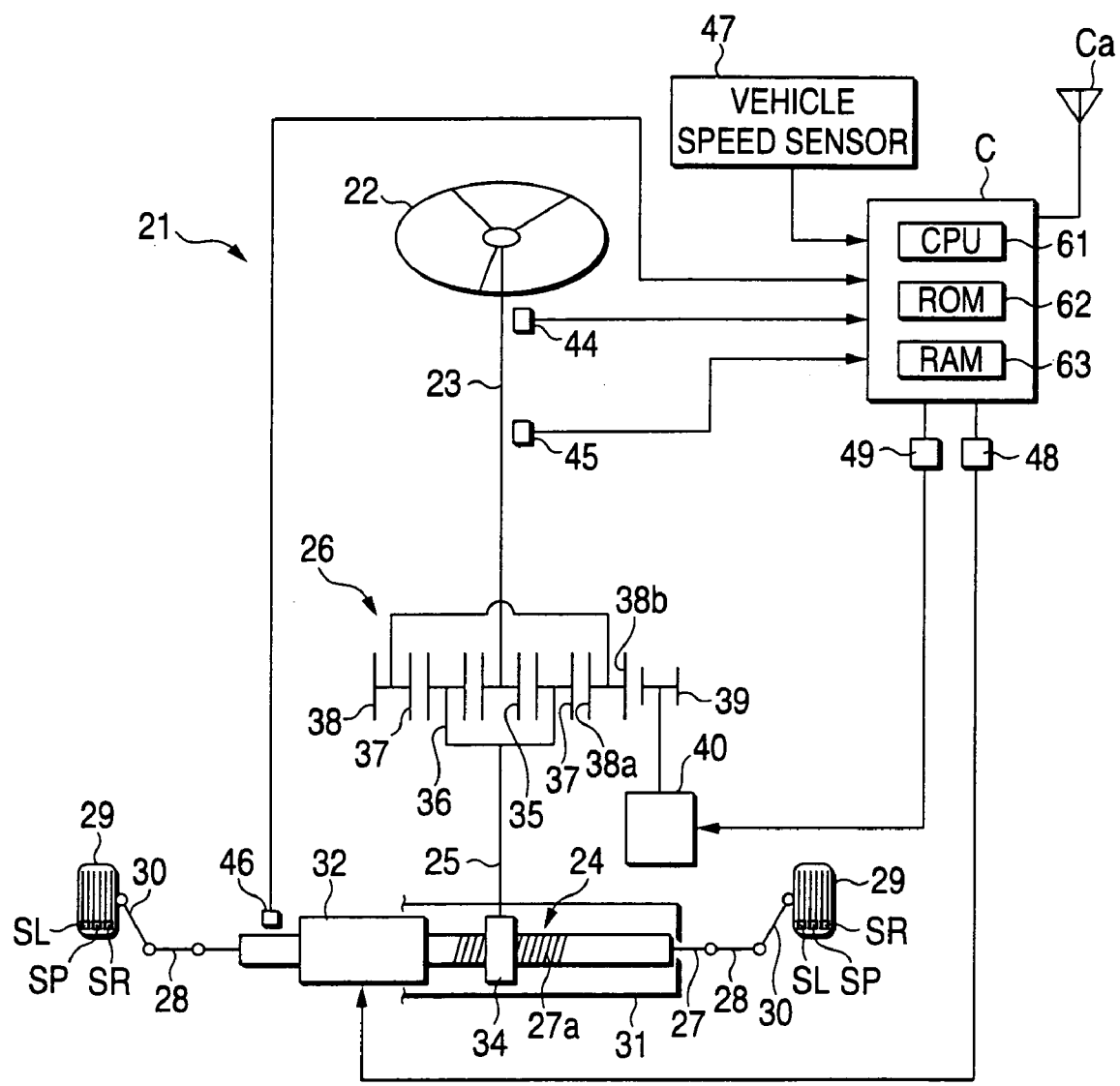
FIG. 8 is a schematic drawing showing a construction of the vehicle steering apparatus according to a second embodiment of the present invention.

FIG. 8 is a schematic drawing showing a construction of a vehicle steering apparatus according to a second embodiment of the present invention. A vehicle steering apparatus 21 includes a first steering shaft 23 linked to a steering wheel 22 as an operating member so as to be capable of rotating integrally therewith, a second steering shaft 25 provided coaxially with the first steering shaft 23 and linked to the steering mechanism 24 such as rack-and-pinion mechanism, and a planetary gear mechanism 26 as a planetary transmission mechanism constituting a differential transmission mechanist for allowing the differential rotation between the first and the second steering shafts 23, 25.

The steering mechanism 24 includes a turning shaft 27 disposed so as to extend laterally of the vehicle, and knuckle arms 30 connected to both ends of the steering shaft 27 via tie rods 28 for supporting the steerable tired-wheels 29. The steering shaft 27 is rotatably supported by a housing 31 so as to be capable of sliding movement in the axial direction, and a steering actuator 32 constructed of an electric motor is coaxially integrated to the midsection thereof. The rotary motion of the steering actuator 32 is converted into a sliding movement of the turning shaft 27 by a movement converting mechanism such as a ball screw mechanism, and turning of a wheel 29 is achieved by the sliding movement of the turning shaft 27.

A rack 27a is formed at a part of the turning shaft 27, and a pinion 34 which is provided at the end of the second steering shaft 25 and rotates integrally with the second steering shaft 25 engages to the rack 27a. In the case where the steering actuator 32 is in failure, when the second steering shaft 25 is rotated according to the operation of the steering wheel 22, rotation of the second steering shaft 25 is converted into a sliding movement of the turning shaft 27 by the pinion 34 and the rack 27a, and turning of the wheel 29 is achieved.

The planetary gear mechanism 26 includes a sun gear 35 connected to the end of the first steering shaft 23 so as to be capable of rotating integrally therewith and situated on the input side, a plurality of planetary gears 37 supported by a carrier 36 on the output side so as to be capable of rotating and meshed with the sun gear 35, and a ring gear 38 as a ring member having internal teeth 38a to be meshed with the respective planetary gears 37 on the inner periphery thereof.

The ring gear 38 constitutes for example a worm wheel by forming external teeth 38b. The external teeth 38b is linked to a reaction force actuator 40 for applying an operation reaction force to the steering wheel 22, for example, via a drive transmission gear 39 constructed, for example, of a worm. The reaction force actuator 40 is constructed for example of an electric motor, and the casing thereof is secured to suitable positions of the vehicle body.

The steering actuator 32 and the reaction force actuator 40 are adapted to be controlled by a control unit C (ECU: electronic control unit) including a CPU 61, a ROM 62 having a control program and the like stored therein, and a RAM 63 to be used as a work area for computing process.

The first steering shaft 23 is provided with a steering angle sensor 44 as steering angle detecting means for detecting the steering angle of the steering wheel 22, and a torque sensor 45 as steering torque detecting means for detecting the steering torque supplied form the steering wheel 22. The detection signal from the steering angle sensor 44 and the torque sensor 45 are supplied to the control unit C.

In addition, the turning shaft 27 is provided with a turning angle sensor 46 for detecting the turning angle of the wheel 29 by detecting the axial position of the turning shaft 27, and the detection signal from the turning angle sensor 46 is supplied to the control unit C. The detection signal from a vehicle speed sensor 47 for detecting the vehicle speed is also supplied to the control unit C.

The tire air pressure sensor SP, the left side stress sensor SL, and the right side stress sensor SR are provided within the tire of the wheel 29 as tire load detecting means as in the case of the first embodiment described above. The output signals from these sensors are taken into the control unit C via an antenna Ca by radio communication.

The control unit C outputs control signals to drive circuits 48, 49 as drive units for driving the steering 20 actuator 32 and the reaction force actuator 40 respectively based on the input signals from the above-described sensors.

The control unit C always observes whether the turning system is operated normally. More specifically, occurrence of abnormalities in at least one of the turning angle sensor 46 and the steering actuator 32 is observed.

When no abnormality exists in the turning system, the control unit C generates a torque for providing a steering reaction force,corresponding to the reaction force of the road surface to the steering wheel 22 by the reaction force actuator 40.

The control unit C drives the steering actuator 32 by setting a voltage instruction value of the steering actuator 32 according to the operating amount of the steering wheel 22, and providing the control signal according to the voltage instruction value to the drive circuit 48. Though the steering wheel 22 and the steering mechanism 24 are connected with each other via the planetary gear mechanism 26, the steering torque applied to the steering wheel 22 is not substantially transmitted to the steering mechanism 24 in a state in which the reaction force actuator 40 is operated only for providing a steering reaction force to the steering wheel 22 without substantially constraining rotation of the ring gear 38.

In this sense, it can be said that the construction shown in FIG. 8 is a steer-by-wire (SBW) type vehicle steering apparatus, and is capable of variable gear ratio control as in the case of the first embodiment described above.

In this embodiment, the control unit C controls the reaction force actuator 40 based on the tire load detected by the stress sensors SL, SR and/or the air pressure sensor SP according to the characteristics shown in FIG. 4 as in the case of the control unit 14 in the first embodiment described above. Accordingly, not only low-frequency information representing the road conditions, but also high-frequency information such as transient information on the tire supporting surface may be transmitted to the driver via the steering wheel 22.

In addition, as in the case of the control unit 14 in the first embodiment described above, the control unit C variably sets the based gear ratio (See FIG. 6) according to the vehicle speed, variably sets the correction amount of the gear ratio (see FIG. 7) according to the amount of variation of the tire load and the vehicle speed, and controls the steering actuator 32 based on the gear ratio obtained by correcting the basic gear ratio with correction amount of the gear ratio (=basic gear ratio+correction amount of the gear ratio). Accordingly, steering control reflecting the road conditions and the tire load conditions adequately is achieved.

When any abnormalities occurred in the turning system, the control unit C stops controlling of the steering actuator 32 to allow the steering actuator 32 to be free to rotate, and constrains the rotation of the ring gear 38 by the reaction force actuator 40, so that the steering torque applied to the steering wheel 22 is transmitted to the steering mechanism 24. In this case, the steering operation can be assisted and the gear ratio can be variably controlled by controlling the reaction force actuator 40.

<Third Embodiment>

Subsequently, referring back to FIG. 8, a third embodiment of the present embodiment will be described. In the third embodiment, the actuator 40 is used as a gear ratio changing actuator for variable gear ratio control, and the steering actuator 32 is used as a steering assist actuator for generating a steering assist force to be applied to the steering mechanism 24.

In other words, the control unit C sets the basic gear ratio according to the characteristics shown in FIG. 6 described above and obtains the gear ratio by correcting the basic gear ratio by the gar ratio correction amount according to the characteristics shown in FIG. 7. Based on the obtained gear ratio (=basic gear ratio+correction amount of the gear ratio), the control unit C controls the reaction force actuator 40 and rotates the ring gear 38 for transmitting the rotation of the steering wheel 22 mechanically to the steering mechanism 24 at the specific gear ratio. Simultaneously, the control unit C drives the steering actuator 32 based on a target value for driving (target current value or target voltage value) set in accordance with the steering torque detected by the torque sensor 45 and the vehicle speed detected by the vehicle speed sensor 47. Accordingly, the steering assistance is achieved.

In this arrangement, a power steering apparatus being capable of variable gear ratio control according to the tire load is realized, and thus preferable steering characteristics are realized.

Figure 9:
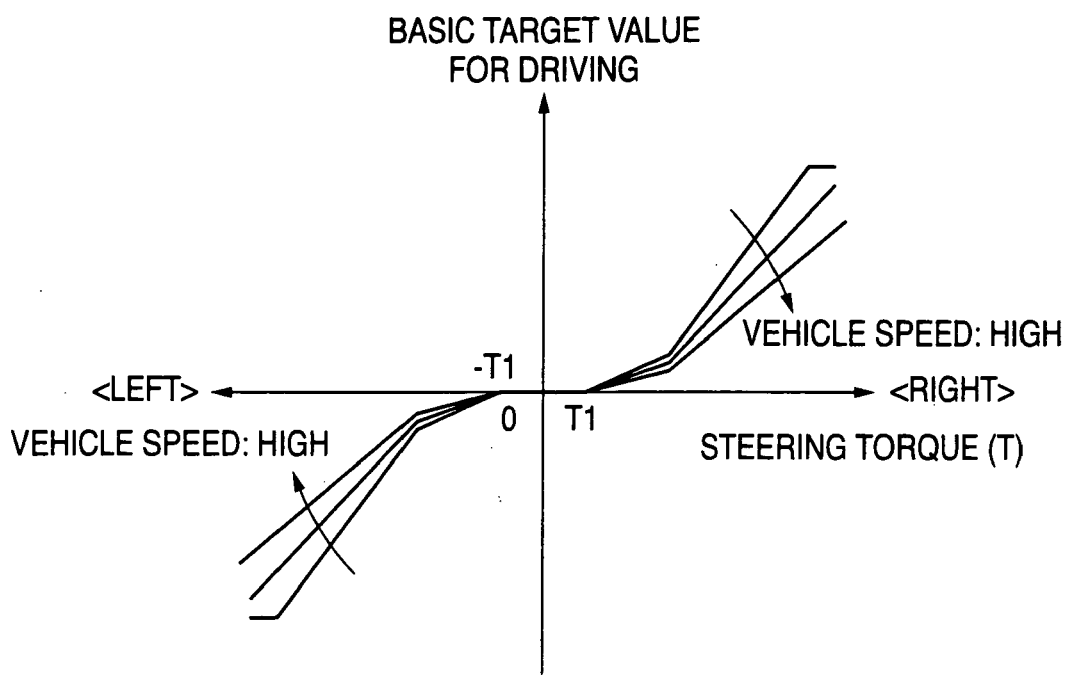
FIG. 9 is a drawing showing a characteristic (assist characteristic) of a basic target value for driving the steering actuator with respect to a steering torque.
Figure 10:
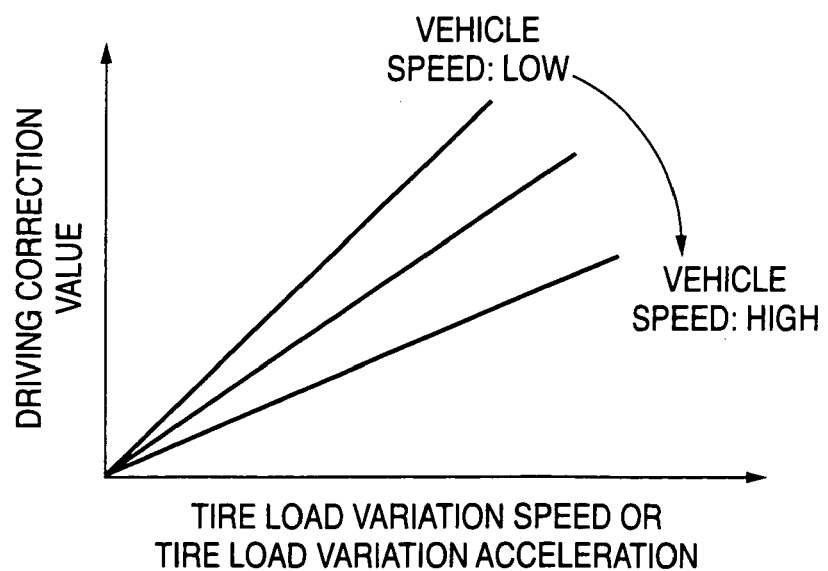
FIG. 10 is a drawing showing a characteristic of a drive correcting value for correcting the basic target value for driving the steering actuator according to the tire load.

In addition, for example, it is also possible to set the basic target value for driving of the steering actuator 32 according to such assist characteristic as to increase with the absolute value of a steering torque T and decrease with increase in the vehicle speed (the torque range from −T1 to T1 is a blind sector) as shown in FIG. 9, and then sets the target value for driving of the steering actuator 32 by correcting the basic target value for driving by a drive correction value ($\geq 0$) according to the characteristics shown in FIG. 10. However, the target value for driving may be obtained by an equation (target value for driving=basic target value for driving+drive correction value) when being steered toward the right, and by an equation (target value for driving=basic target value for driving−drive correction value) when being steered toward the left.

In the example in FIG. 10, for example, the correction value to be set increases with the tire load variation speed or in the tire load variation acceleration of the tire on the outer side with respect to the steering direction (first time derivative or the second time derivative of the difference of the detected stress value on the left and the right side walls), so that the basic target value for driving is corrected to a large extent. In addition, the correction value decrease with increase in the vehicle speed.

In this manner, since the extent of correction applied to the target value for driving increases with the absolute value of the tire load variation speed or the tire load variation acceleration, an adequate steering assist in accordance with the road conditions or the tire load is achieved. In addition, when the vehicle speed is high, a stable steering characteristic is achieved by reducing the correction amount according to the tire load.

Thought three embodiments of the present invention have been described, the present invention may be embodied in other modes. For example, in a normal electric power steering apparatus in which the steering wheel and the steering mechanism is linked by the steering shaft with the intermediary of a torsion bar, and a steering assist force is applied to the steering mechanism from an electric motor, steering assist according to the road conditions or the tire load is achieved by controlling the electric motor according to the characteristics shown in FIG. 9 and FIG. 10.

The present invention may also be applied to a power steering apparatus constructed in such a manner that a hydraulic pressure is generated by a pump driven by an electric motor, and a drive force generated by a power cylinder driven by this hydraulic pressure is transmitted to the steering mechanism In other words, steering assist with a desirable responsibility with respect to the road conditions or the like by correcting the basic target value for driving of the electric motor according to the tire load.

<Fourth Embodiment>

Figure 11:
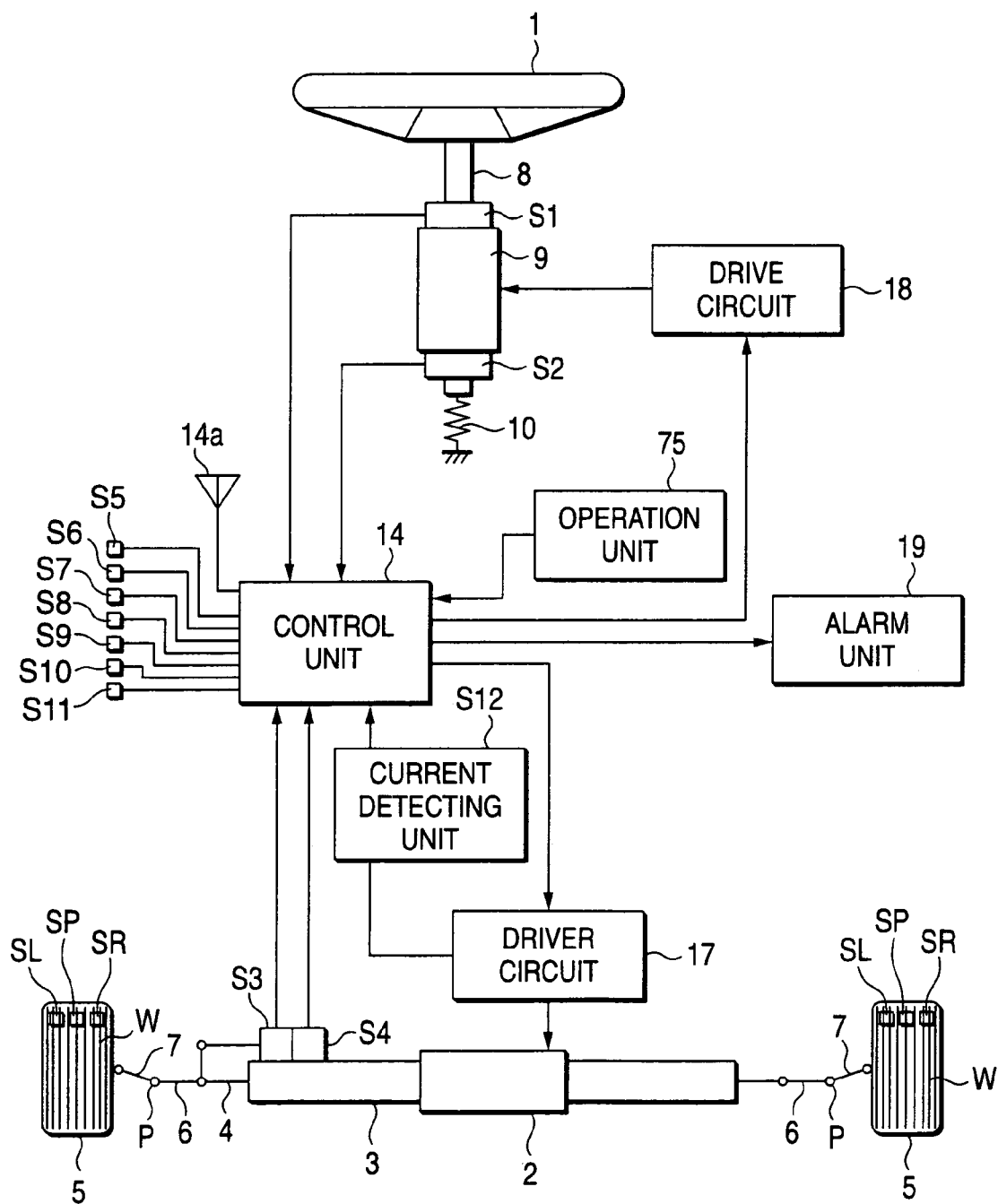
FIG. 11 is a conceptual drawing illustrating a construction of the vehicle steering apparatus according to a fourth embodiment of the present invention.

FIG. 11 is a conceptual drawing illustrating a construction of a vehicle steering apparatus according to a fourth embodiment of the present invention. The parts or means represented by the same reference numerals as FIG. 1 are not described here.

In the vehicle steering apparatus shown in FIG. 11, an operating angle sensor S1 for detecting the operating angle of the steering wheel 1 is provided relating to the revolving shaft 8 in order to detect an operating input value of the steering wheel 1. The revolving shaft 8 is provided with a torque sensor S2 for detecting the operating torque applied to the steering wheel 1. On the other hand, relating to the turning shaft 4, a turning angle sensor S3 for detecting the turning angle of the steerable tired-wheel 5 (tire angle) and an axial force sensor S4 for detecting the axial force applied to the turning shaft 4 are provided.

In addition to these sensors, there are provided a vehicle speed sensor S5 for detecting the vehicle speed, a fore-and-aft acceleration sensor S6 for detecting acceleration in the fore-and-aft direction of the vehicle, a lateral acceleration sensor S7 for detecting the lateral acceleration of the vehicle, a yaw rate sensor S8 for detecting the yaw rate of the vehicle, a stroke sensor S9 for detecting the stroke (displacement) of a shock absorber, a brake fluid sensor S10 for detecting the pressure of the brake oil, a load sensor S11 for detecting the load of the vehicle, and a current detecting unit S12 for detecting a drive current supplied from the drive circuit 17 to the steering actuator 2 (a force applied to the turning shaft 4 may be detected indirectly by detecting the drive current).

In addition, as is described later, the left side stress sensor SL and the right side stress sensor SR for detecting stresses applied to the left and the right side walls of the tire W, and the air pressure sensor SP for detecting the air pressure of the tire W are provided.

The detection signals from these sensors S1–S12, SL, SR, SP are supplied to the control unit 14 constructed of an electronic control unit (ECU) including a microcomputer. However, the detection signal from the stress sensors SL, SRP and the air pressure sensor SP are received by the control unit 14 via the antenna 14a by radio communication.

The control unit 14 sets the steering instruction value based on the operating angle detected by the operating angle sensor S1, the turning angle detected by the turning angle sensor S3, the vehicle speed detected by the vehicle speed sensor S5, the tire stress detected by the stress sensors SL, SR, and the air pressure of the tire detected by the air pressure sensor SP, controls the steering actuator 2 via the drive circuit 17 according to a steering instruction value.

Since the steering wheel 1 and the steering mechanism are not mechanically linked, VGR (Variable Gear Ratio) function in which the amount of rotation of the steering wheel 1 and the amount of turn of the wheel 5 (transmission ratio, gear ratio) are variably set is achieved. In other words, for example, the control unit 14 sets the gear ratio based on the vehicle speed detected by the vehicle speed sensor 55 and the tire load detected by the stress sensors SL, SR and/or the air pressure sensor SP, and based on the gear ratio and the operating angle of the steering wheel 1, sets the steering instruction value corresponding to the voltage to be applied to the steering actuator 2.

On the other hand, the control unit 14 controls the reaction force actuator 9 via the drive circuit 18 based on the detection signals supplied from the sensors S1–S12 so that an adequate reaction force in the direction opposite from the operating direction of the steering wheel 1 is generated.

The alarm unit 19 provided on an instrument panel of the vehicle is connected to the control unit 14. The alarm unit 19 may be constructed of an alarm sound generating device or of an alarm display device providing an alarm display (lamp indication or message display) The control unit 14 generates an alarm from the alarm unit 19 when a predetermined abnormality or a predetermined traveling states (traveling on the punishing road, generation of flutter, and occurrence of unbalance) based on the output signals from the sensors S11-S12 (especially, the turning angle sensor S3, the vehicle speed sensor S5, and the stroke sensor S9).

FIG. 2 is a diagrammatic cross-sectional view illustrating a construction of a tire W of the steerable tired-wheel 5. The tire W includes a tread portion 51 which comes into contact with the road surface and a pair of side wall portions 52L, 52R joined to both sides of the tread portion 51. The right side stress sensor SR is disposed on the inner wall surface of the side wall portion 52R on the right side when viewed toward the direction of travel of the vehicle, and the left side stress sensor SL is disposed on the inner wall surface of the side wall portion 52L on the left side when viewed toward the direction of travel of the, vehicle. On the inner wall surface of the tread portion 51, there is disposed an air pressure sensor SP. Alternatively, for example, the stress sensor SA may be embedded in the tread portion 51.

The right side stress sensor SR and the left side stress sensor SL detect stresses applied to the right side wall portion 52R and the left side wall portion 52L respectively, and includes a sensor unit such as a strain gauge, a transponder unit for transmitting detection signals of the sensor unit by radio, and an electricity storing unit for converting the rotational movement of the tire W into electric energy and storing the converted energy, so as to be operated by the electric energy stored in the electricity storing unit. Likewise, the air pressure sensor SP is disposed inside the tire W, and includes the sensor unit for detecting the internal air pressure of the tire W, the transponder unit for transmitting the detection signals of the sensor unit by radio, and the electricity storing unit for converting the rotational movement of the tire W into electric energy, and storing the converted electric energy, so as to be operated by the stored electric energy. The signals emitted from the transponder unit is received by the control unit 14 via the antenna 14a.

The stress sensor and the air pressure sensor may be those which is publicly known, such as ones disclosed in Patent Document 2 and Patent Document 3, as in the case of the first embodiment.

In this embodiment, the control unit 14 determines the presence of information to be informed to the driver based on the analytic solution (frequency characteristic obtained by derivatives, integrals, power spectrum analysis of vibrations) obtained by analyzing vibrations of the steering system (such as flutter or shimmy caused by abnormal control due to faulty maintenance or abnormal signals relating to consumable goods or components of the mechanism), or vibrations in tire and suspension system (vibrations due to unbalance) by processing signals such as signals from displacement sensors (such as the operating angle sensor S1, the turning angle sensor S3, or the stroke sensor S9) provided on the vehicle and/or each component (at the positions where the physical amount relating to the movement of the vehicle is detected) and signals from the acceleration sensor (such as the fore-and-aft direction acceleration sensor S6 and the lateral acceleration sensor S7). In addition, when there is any information to be informed to the driver, whether or not such information should be transmitted to the driver as an operation reaction force, or visually or acoustically via the alarm unit 19 is determined, and then the specific information is transmitted to the driver in a manner according to the results of determination.

The control unit 14 further controls the steering actuator 2 based on the output of the operating angle sensor S1 or the tire load detected by the stress sensors SL, SR and the air pressure sensor SP (steering control).

On the other hand, in addition to information informed by the alarm unit 19 or the steering wheel 1, the driver senses the acceleration G on the vehicle, and also senses the vehicle speed V, the yaw rate γ, the roll φ, and the pitch τ. Based on such information, the driver controls the steering wheel 1 for performing precognitive control, tracking control and correction control.

Precognitive control is a kind of control to be performed by the driver while forecasting the coming conditions. Tracking control is a kind of control to track a certain behavior of the vehicle which is intended by the driver as a target. Correction control is a kind of control to correct a disturbance such as lateral wind. These types of control are performed based on knowledge of the driver relating to the operation of the vehicle, and such knowledge may be classified into a knowledge based on the skill, a knowledge based on the rule, and a knowledge based on the intelligence.

The skill-based knowledge relating the operation is a knowledge taken by the body, that is, a knowledge that makes himself/herself act spontaneously based on information taken through five senses without consciousness. The rule-based knowledge relating the operation is a knowledge that makes himself/herself act according to the judgment (for example, whether or not certain conditions are conformed) based on the memory of the driver, that is, a knowledge relating to the patterned action. The intelligence-based knowledge relating to the operation is not a knowledge relating to the patterned action, but an advanced knowledge that makes himself/herself act through a thought which is conscious, abstract, and logical thought.

For example, road surface information informed to the driver via the steering wheel 1 as low-frequency information works with the driver's rule-based knowledge and urges him/her to perform the patterned driving action. In contrast, transient information on the tire supporting surface informed to the driver also via the steering wheel 1 works with the driver's intelligence-based knowledge and is used for an advanced determination (such as whether or not the vehicle is at the critical point where the steering torque is released).

Figure 12:
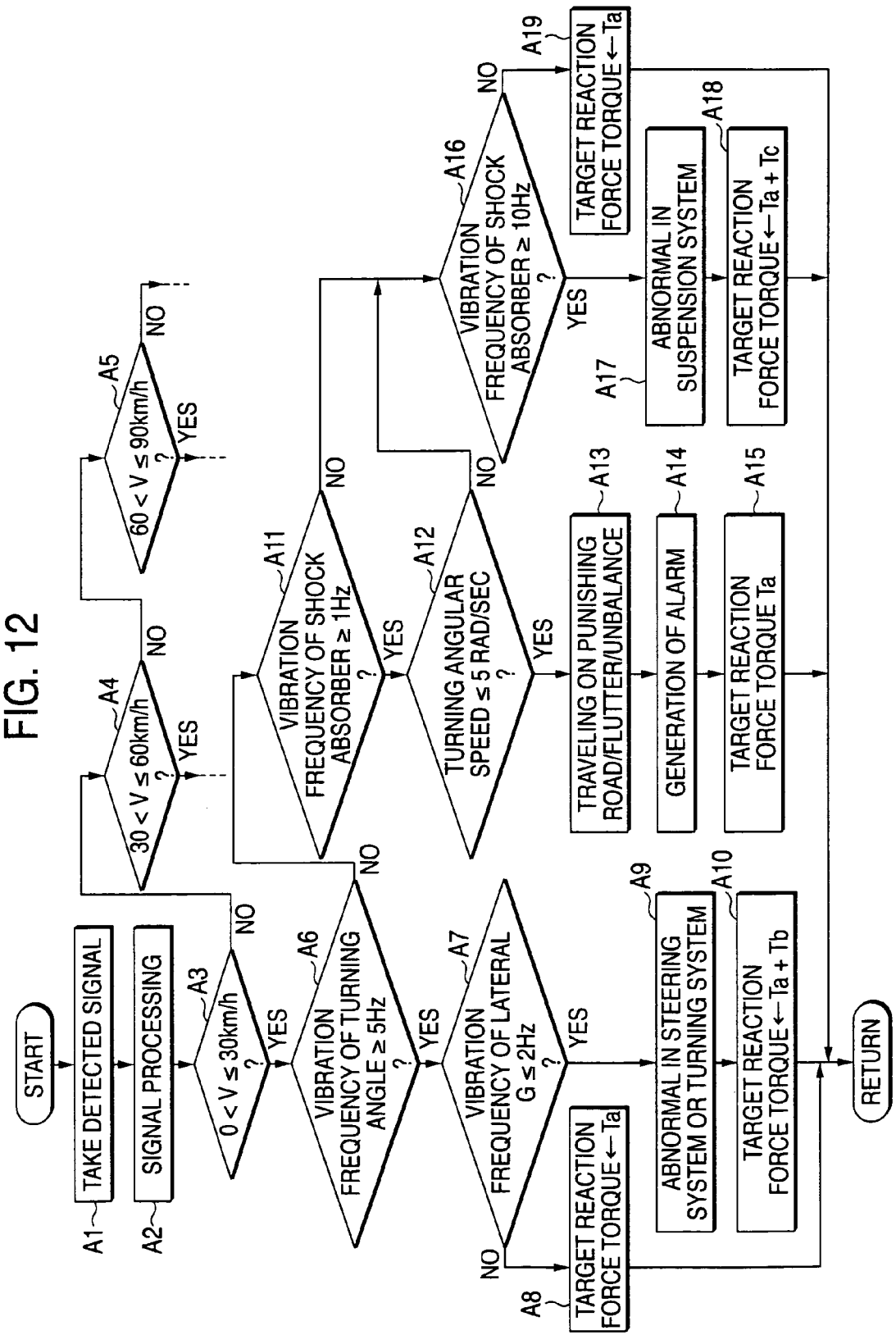
FIG. 12 is a flowchart for illustrating a process to be executed by the control unit for informing information to the driver by control of the reaction force actuator or via an alarm unit.

FIG. 12 is a flowchart for illustrating a process to be executed by the control unit 14 for informing information to the driver by control of the reaction force actuator 9 or via the alarm unit 19. In a first place, detection signals supplied by the sensors S1-S12 are taken (Step A1), then, a signal processing for the detection signals from the sensors S1–S12 is performed (Step A2). More specifically, processing such as derivative processing, integral processing, analysis of signal periodicity, envelope detection, analysis of frequency characteristics by the spectrum analysis is performed. Further specifically, vibration frequency of the output signal from the turning angle sensor S3 (vibration frequency for turning angle), vibration frequency of the output signal from the stroke sensor S9 (vibration frequency for the shock absorber), and derivative of the output signal from the turning angle sensor S3 (turning anglular speed) are obtained. In addition, vibration frequencies of the lateral acceleration detected by a lateral acceleration sensor S7 (lateral G), the yaw rate detected by a yaw rate sensor S8, a shock absorber stroke detected by a stroke sensor S9, the brake fluid pressure detected by a brake fluid pressure sensor S10.

The control unit 14 further divaricates the processing depending which one of a predetermined plurality of speed regions (in the present embodiment, four speed regions of 0 km/h<V≦30 km/h, 30 km/h<V≦60 km/h, 60 km/h<V≦90 km/h, 90 km/h<V) a vehicle speed V detected by the vehicle speed sensor S5 belongs to (Step A3, A4, A5).

For example, when the vehicle speed V is a value within the range 0 km/h<V≦30 km/h (Yes in Step A3), whether or not the vibration frequency for the turning angle is not lower than 5 Hz, which is a predetermined threshold is determined (Step A6) If the answer is YES in this determination, it is possible that abnormalities occurred in the steering system or the turning system. Therefore, whether or not the vibration frequency of one or predetermined two of the lateral acceleration detected by the lateral acceleration sensor S7 (lateral G), the yaw rate detected by the yaw rate sensor S8, the shock absorber stroke detected by the stroke sensor S9, and the brake fluid pressure detected by the brake fluid pressure sensor S10 is 2 Hz or below, which is a predetermined threshold, is determined (Step A7). When the answer in this step is NO, it is determined that the steering system or the turning system is in the normal condition, and the target reaction force torque for driving the reaction force actuator 9 is set to a target reaction force torque value Ta for a normal state (Step A8) (when no abnormality exists), and then the procedure returns. The target reaction force torque value for the normal state is a value reflecting the tire load detected by the stress sensors SL, SR or the air pressure sensor SP.

On the other hand, the vibration frequency of one or predetermined two of the lateral acceleration, the yaw rate, the shock absorber stroke, and the brake fluid pressure is determined to be 2 Hz or below in Step A7, it is determined that there is an abnormality in the steering system or the turning system, (Step A9). In this case, the control unit 14 sets the target reaction force torque for driving the reaction force actuator 9 to a value Ta+Tb, which is the value of the target reaction force torque value Ta in the normal state added with the correction torque value Tb (the correction torque for the case of abnormalities in the steering system or the turning system) (Step A1) and the procedure returns.

The correction torque value Tb is determined according to the vibration frequency of an object value which is determined to be 2 Hz or below in Step A7, and, for example, increases with the vibration frequency. The correction torque value Tb may be determined according to the vehicle speed or the turning angle, and the correction torque value may be determined so as to increase with the vehicle speed, or in the turning angle.

When the turning angle vibration frequency is less than 5 Hz (when NO in Step A6), there may be an abnormality in the suspension system. Therefore, whether or not the vibration frequency of the shock absorber is 1 Hz or higher, which is a predetermined first threshold is determined (Step A11). When the vibration frequency of the shock absorber is 1 Hz or higher, whether or not the turning anglular speed is below 5 rad/sec, which is a predetermined threshold is determined (Step A12). When the answer is YES in this step, it is determined that the vehicle is traveling on the punishing read, or suffering form flutter or unbalance (Step A13), and thus such abnormalities are informed to the driver via the alarm unit 19 (Step A14) Then the target reaction force torque for controlling the reaction force actuator 9 is set to the target reaction force torque value Ta in the normal state (Step A15) and the procedure returns.

When the turning angle frequency is less than 5 Hz, but the vibration frequency of the shock absorber is less than 1 Hz (NO in the step A11), or when the turning angle frequency is less than 5 Hz and the vibration frequency of the shock absorber is 1 Hz or higher, but the turning speed exceeds 5 rad/sec (No in Step A12), the vibration frequency of the shock absorber is 10 Hz or higher, which is a predetermined second threshold, is determined in order to inspect the presence of an abnormality in the suspension system (Step A16). When the answer of this determination is YES, it is determined that there is an abnormality in the suspension system (Step A17), and the control unit 14 sets the target reaction force torque for driving the reaction force actuator 9 to a value Ta+Tc which is the target reaction force torque value Ta in the normal state added with the correction torque value Tc (the correction torque to be used in the case where there is an abnormality in the suspension system) (Step A18) and the procedure returns.

The correction torque value Tc is determined according, for example, to the vibration frequency of the shock absorber, and for example, the correction torque value Tc increases with the vibration frequency of the shock absorber. Further, the correction torque value Tc may be determined according to the vehicle speed or the turning angle, and may be increased with the vehicle speed, or in the turning angle.

When the answer of the determination in Step A16 is NO, it is determined that there is no abnormality in the suspension system, and the target reaction force torque for driving the reaction force actuator 9 to a value Ta, which is a target reaction force torque value in the normal state (when no abnormality exists).

In the vehicle speed ranges of 30 km/h<V≦60 km/h, 60 km/h<V≦90 km/h, 90 km/h<V as well, the type of the vibration frequency to be determined is selected as needed, and the threshold for each vibration frequency is adequately set before the processing as described above is executed.

As a result of such processing, if there is any abnormalities in the steering system, the turning system, and suspension system, it is informed to the driver via the steering wheel 1 by differentiating the steering reaction force applied to the steering wheel 1 from the value in the normal state (Ta). On the other hand, information such that the vehicle is traveling in the punishing road, or suffering from flutter or unbalance is informed to the driver via the alarm unit 19, not via the steering wheel 1. In this manner, since an adequate transmission route is selected depending on the type of the occurred abnormality, transmission of information to the driver is smoothly performed, and mental and physical stress exerted to the driver during operation of the vehicle may be alleviated, thereby realizing a comfortable driving environment.

In addition, in this embodiment, the reaction force actuator 9 is adapted to be controlled according to the tire load detected directly by the left and the right stress sensors SL, SR or the air pressure sensor SP attached to the tire. Therefore, since a suitable control of reaction force may be performed without depending on the mechanical construction of the steering mechanism, application of the vehicle adaptation technology for differentiating reaction force control for every individual type of vehicle or vehicle may be reduced or even eliminated Accordingly, the period required for development of the vehicle steering apparatus may significantly be shortened.

In addition, since the vehicle steering apparatus is constructed to detect the state of the load applied to the tire W directly by the left and the right stress sensors SL, SR and the air pressure sensor SP, complicated computing processing is not necessary, and thus the reaction force actuator 9 may be controlled with a high-speed responsibility in the order of several tens milliseconds. Therefore, transient information on the tire supporting surface such as the critical limit of grip can be informed to the driver via the steering wheel 1.

<Fifth Embodiment>

Figure 13:
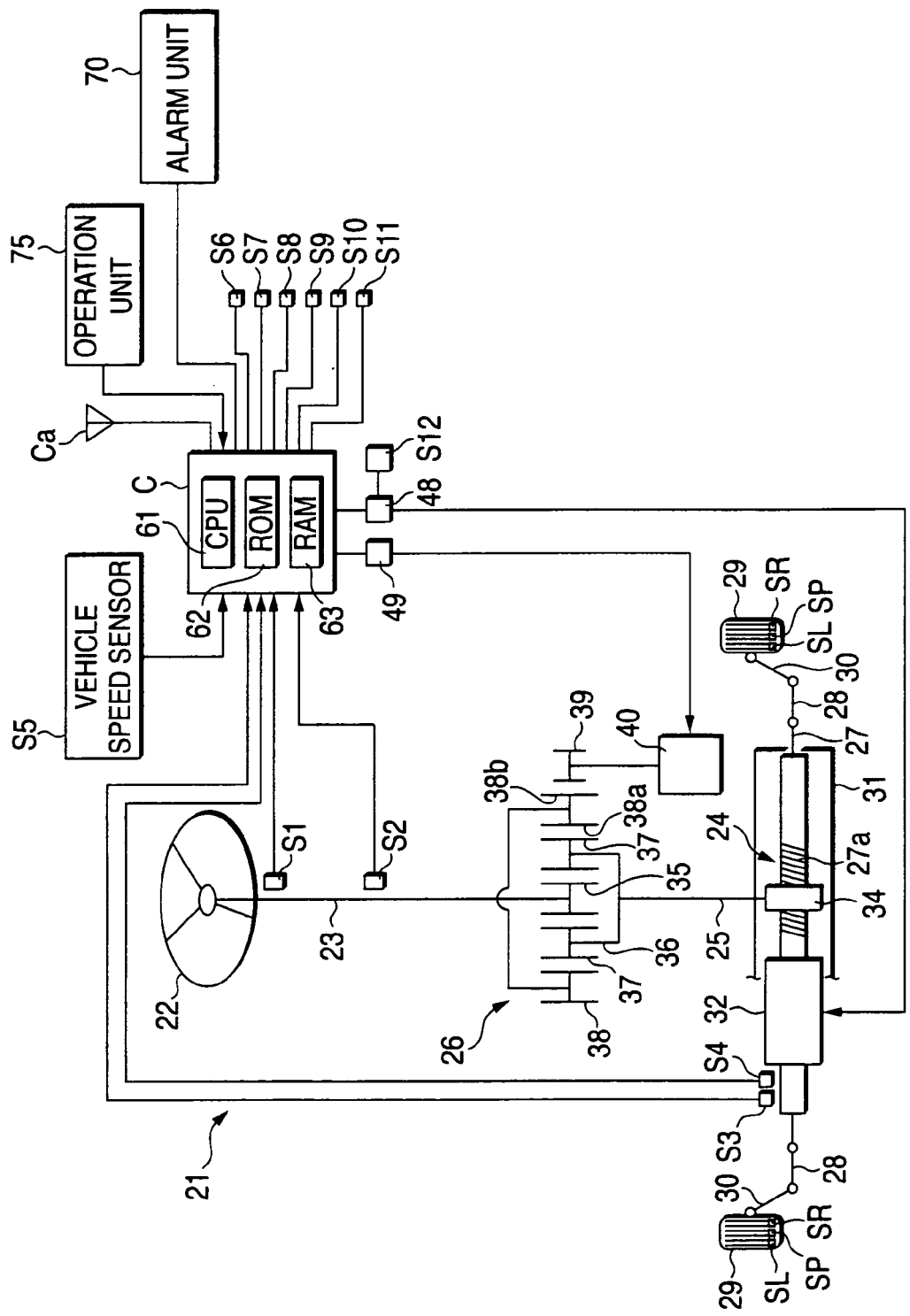
FIG. 13 is a diagrammatic drawing showing a construction of the vehicle steering apparatus according to a fifth embodiment of the present invention.

FIG. 13 is a diagrammatic drawing showing a construction of the vehicle steering apparatus according to a fifth embodiment of the present invention. The vehicle steering apparatus 21 includes the first steering shaft 23 to be linked to the steering wheel 22 as an operating member so as to be capable of rotating integrally therewith, the second steering shaft 25 provided coaxially with the first steering shaft 23 and linked to the steering mechanism 24 such as rack-and-pinion mechanism, and the planetary gear mechanism 26 as a planetary transmission mechanism constituting a differential transmission mechanism for allowing the differential rotation between the first and the second steering shafts 23, 25.

The steering mechanism 24 includes the turning shaft 27 disposed so as to extend laterally of the vehicle, and the knuckle arms 30 connected to both ends of the steering shaft 27 via the tie rods 28 for supporting the steerable tired-wheels 29. The steering shaft 27 is rotatably supported by the housing 31 so as to be capable of sliding movement in the axial direction, and the steering actuator 32 constructed of an electric motor is coaxially integrated to the midsection thereof. The rotary motion of the steering actuator 32 is converted into a sliding movement of the turning shaft 27 by a movement converting mechanism such as a ball screw mechanism, and turning of the wheel 29 is achieved by the sliding movement of the turning shaft 27.

The rack 27a is formed at a part of the turning shaft 27, and the pinion 34 which is provided at the end of the second steering shaft 25 and rotates integrally with the second steering shaft 25 engages to the rack 27a. In the case where the steering actuator 32 is in failure, when the second steering shaft 25 is rotated according to the operation of the steering wheel 22, rotation of the second steering shaft 25 is converted into a sliding movement of the turning shaft 27 by the pinion 34 and the rack 27a, and turning of the wheel 29 is achieved.

The planetary gear mechanism 26 includes the sun gear 35 connected to the end of the first steering shaft 23 so as to be capable of rotating integrally therewith and situated on the input side, the plurality of planetary gears 37 supported by the carrier 36 on the output side so as to be capable of rotating and meshed with the sun gear 35, and the ring gear 38 as a ring member having internal teeth 38a to be meshed with the respective planetary gears 37 on the inner periphery thereof.

The ring gear 38 constitutes for example a worm wheel by forming external teeth 38b. The external teeth 38b is linked to the reaction force actuator 40 for applying an operation reaction force to the steering wheel 22, for example, via a drive transmission gear 39 constructed of a worm. The reaction force actuator 40 is constructed for example of an electric motor, and the casing thereof is secured to suitable positions of the vehicle body.

The steering actuator 32 and the reaction force is actuator 40 are adapted to be controlled by the control unit C (ECU: electronic control unit) including the CPU 61, the ROM 62 having a control program and the like stored therein, and the RAM 63 to be used as a work area for computing process.

The first steering shaft 23 is provided with the steering angle sensor S1 as steering angle detecting means for detecting the steering angle of the steering wheel 22, and the torque sensor S2 as steering torque detecting means for detecting the steering torque supplied form the steering wheel 22. The detection signal from the steering angle sensor S1 and the torque sensor S2 are supplied to the control unit C.

In addition, the turning shaft 27 is provided with the turning angle sensor S3 for detecting the turning angle of the wheel 29 by detecting the axial position of the turning shaft 27 and the axial force censor S4 for detecting the axial force applied to the turning shaft 27, and the detection signals from the turning angle sensor S3 and the axial force sensor S4 is supplied to the control unit C. The detection signal from the vehicle speed sensor S5 for detecting the vehicle speed is also supplied to the control unit C.

In addition, the control unit C is supplied with signals from the fore-and-aft acceleration sensor S6 for detecting the acceleration in the fore-and-aft direction of the vehicle, the lateral acceleration sensor S7 for detecting the lateral acceleration of the vehicle, the yaw rate sensor S8 for detecting the yaw rate of the vehicle, the stroke sensor S9 for detecting the stroke (displacement) of the shock absorber, the brake fluid pressure sensor S10 for detecting the brake oil pressure, the load sensor S11 for detecting the load of the vehicle, and the current detecting unit S12 for detecting the drive current supplied to the steering actuator 32. The tire air pressure sensor SP, the left side stress sensor SL, and the right side stress sensor SR are provided within the tire of the wheel 29 as tire load detecting means as in the case of the fourth embodiment described above. The output signals from these sensors are taken into the control unit C via the antenna Ca by radio communication.

The control unit C outputs control signals to drive circuits 48, 49 as drive units for driving the steering actuator 32 and the reaction force actuator 40 respectively based on the input signals from the above-described sensors.

The control unit C always observes whether the turning system is operated normally. More specifically, occurrence of abnormalities in at least one of the turning angle sensor 46 and the steering actuator 32 is observed.

When no abnormality exists in the turning system, the control unit C generates a torque for providing a steering reaction force corresponding to the reaction force of the road surface to the steering wheel 22 by the reaction force actuator 40.

The control unit C drives the steering actuator 32 by setting a voltage instruction value of the steering actuator 32 according to the operating amount of the steering wheel 22, and providing the control signal according to the voltage instruction value to the drive circuit 48. Though the steering wheel 22 and the steering mechanism 24 are connected with each other via the planetary gear mechanism 26, the steering torque applied to the steering wheel 22 is not substantially transmitted to the steering mechanism 24 in a state in which the reaction force actuator 40 is operated only for providing a steering reaction force to the steering wheel 22 without substantially constraining rotation of the ring gear 38. In this sense, it can be said that the construction shown in FIG. 13 is a steer-by-wire (SBW) type vehicle steering apparatus, and is capable of variable gear ratio control as in the case of the fourth embodiment described above.

In this embodiment, the control unit C controls the reaction force actuator 40 based on the tire load detected by the stress sensors SL, SR and/or the air pressure sensor SP according to the characteristics shown in rig. 4 as in the case of the control unit 14 in the fourth embodiment described above. Accordingly, not only low-frequency information representing the road conditions, but also high-frequency information such as transient information on the tire supporting surface may be transmitted to the driver via the steering wheel 22.

In addition, as in the case of the control unit 14 in the fourth embodiment described above, the control unit C performs the processing as shown in FIG. 12, and processes the signals from the sensors. Based on the vibration frequencies or the like, when there is an abnormality in the steering system, turning system, and the suspension system, it is informed to the driver by the reaction force control, and such information that the vehicle is traveling on the punishing road, or suffering from the flutter or unbalance is informed to the driver via the alarm unit 70 (the similar construction as the alarm unit 19 in the fourth embodiment).

When any abnormalities occurred in the turning system, the control unit C stops controlling of the steering actuator 32 to allow the steering actuator 32 to be free to rotate, and constrains the rotation of the ring gear 38 by the reaction force actuator 40, so that the steering torque applied to the steering wheel 22 is transmitted to the steering mechanism 24. In this case, the steering operation can be assisted and the gear ratio can be variably controlled by controlling the reaction force actuator 40.

Though two embodiments of the present invention has been described thus far, the present invention may be embodied in other modes. For example, as shown in FIG. 11 and FIG. 13, it is also possible to connect an operating unit 75 to the control unit 14, C, and adjust the magnitude of the operating reaction force by operating the operating unit 75.

Alternatively, for example, it is also applicable to link the steering wheel and the steering mechanism with the steering shaft with the intermediary of the torsion bar, and provides the actuator which provides a force to the steering wheel even in the normal electric power steering apparatus which provides a steering assist force from the electric motor to the steering mechanism and an alarm unit so that occurrence of abnormalities is informed to the driver while selecting one of the steering wheel and the alarm unit depending on the type of the abnormality.

The same construction may also be employed in the power steering apparatus constructed in such a manner that a hydraulic pressure is generated by a pump driven by the electric motor, and a drive force generated by a power cylinder driven by this hydraulic pressure is transmitted to the steering mechanism.

Other various modification in design may be made within the scope of the attached claims.

What is claimed is:

1. A vehicle steering apparatus comprising:
   a steering mechanism for turning a steerable tired-wheel;
   a steering actuator for providing a steering force to the steering mechanism;
   a load detecting unit for detecting a tire load, which is a load applied to a tire of a vehicle; and
   a steering control unit for controlling the steering actuator according to the tire load detected by the load detecting unit.

2. The vehicle steering apparatus according to claim 1, wherein the load detecting unit comprises an air pressure detecting unit for detecting an air pressure of the tire.

3. The vehicle steering apparatus according to claim 2, wherein the load detecting unit comprises a stress detecting unit for detecting a stress applied to the tire.

4. The vehicle steering apparatus according to claim 1, wherein the load detecting unit comprises a stress detecting unit for detecting a stress applied to the tire.

5. The vehicle steering apparatus according to claim 4, wherein the stress detecting unit includes a left side stress detecting unit and a right side stress detecting unit for detecting stresses applied to a left side and a right side of the tire, respectively, when viewed toward a direction of travel of the vehicle.

6. The vehicle steering apparatus according to claim 5, further comprising:
   a steering direction detecting unit for detecting a steering direction of the vehicle,
   wherein the steering control unit controls the steering actuator based on the steering direction of the vehicle detected by the steering direction detecting unit and stresses detected by the left side stress detecting unit and the right side stress detecting unit, respectively.

7. The vehicle steering apparatus according to claim 6, wherein the steering control unit controls the steering actuator based on the steering direction of the vehicle detected by the steering direction detecting unit and stresses applied on outer portions of the tire when viewed in the direction of travel detected by the left side stress detecting unit and the right side stress detecting unit.

8. The vehicle steering apparatus according to claim 1, wherein the steering apparatus comprises a steer-by-wire system.

9. The vehicle steering apparatus according to claim 1, wherein the steering apparatus is devoid of a mechanical linkage between a steering wheel and said steering mechanism.

10. The vehicle steering apparatus according to claim 1, wherein said steering actuator provides the steering force to the steering mechanism to steer the front left and front right wheels of the vehicle.

11. The vehicle steering apparatus according to claim 1, wherein said load detecting unit comprises an air pressure detecting unit for detecting the air pressure of the tire and a stress detecting unit for detecting a stress applied to the tire.

12. The vehicle steering apparatus according to claim 11, wherein said stress detecting unit comprises a right side stress sensor and a left side stress sensor.

13. The vehicle steering apparatus according to claim 11, wherein said air pressure detecting unit and said stress detecting unit are disposed along an interior surface of each tire of the vehicle.

14. A vehicle steering apparatus in which the steering mechanism for turning the steerable wheel is operated according to an operation of an operating member for steering the vehicle, comprising:
   a reaction force actuator for providing an operation reaction force to the operating member;
   a load detecting unit for detecting a tire load which is applied to a tire of the vehicle; and
   a reaction force control unit for controlling the reaction force actuator according to the tire load detected by the load detecting unit.

15. The vehicle steering apparatus according to claim 14, wherein the load detecting unit comprises an air pressure detecting unit for detecting an air pressure of the tire.

16. The vehicle steering apparatus according to claim 14, wherein the load detecting unit comprises a stress detecting unit for detecting a stress applied to the tire.

17. The vehicle steering apparatus according to claim 14, wherein the load detecting unit comprises a stress detecting unit for detecting a stress applied to the tire.

18. The vehicle steering apparatus according to claim 17, wherein the stress detecting unit comprises a left side stress detecting unit and a right side stress detecting unit for detecting stresses applied to a left side and a right side of the tire, respectively, when viewed toward a direction of travel of the vehicle.

19. The vehicle steering apparatus according to claim 18, further comprising:
 a steering direction detecting unit for detecting a steering direction of the vehicle,
 wherein the reaction force control unit controls the reaction force actuator based on the steering direction of the vehicle detected by the steering direction detecting unit and stresses detected by the left side stress detecting unit and the right side stress detecting unit, respectively.

20. The vehicle steering apparatus according to claim 19, wherein the reaction force control unit controls the reaction force actuator based on a steering direction of the vehicle detected by the steering direction detecting unit and the stresses applied on outer portions of the tire when viewed in the direction of travel detected by the left side stress detecting unit and the right side stress detecting unit.

21. A vehicle steering apparatus in which a steering mechanism for turning a steerable tired-wheel is operated according to operation of an operating member to be operated by a driver, comprising:
 an actuator for applying a force to the operating member for transmitting information to the driver;
 at least one sensor for detecting a physical amount relating to a movement of the vehicle and outputting a detection signal according to a detected result;
 a signal analyzing unit for analyzing the detection signal output by the sensor and supplying an analytical solution; and
 a control unit for controlling the actuator based on the analytical solution supplied from the signal analyzing unit.

22. The vehicle steering apparatus according to claim 21, further comprising:
 a first determining unit for determining whether the analytical solution analyzed by the signal analyzing unit conforms to a predetermined first reference condition; and
 a teaching unit for providing, when the analytic solution of the signal analyzing unit conforms to the predetermined first reference condition, a teaching corresponding to a result of determination to the driver.

23. The vehicle steering apparatus according to claim 22, further comprising:
 a second determining unit for determining whether the analytical solution analyzed by the signal analyzing unit conforms to a predetermined second reference condition;
 wherein when the analytic solution of the signal analyzing unit is determined to conform to the second reference condition by the second determining unit, the control unit controls the actuator according to the analytic solution.

24. The vehicle steering apparatus according to claim 22, further comprising:
 a second determining unit for determining whether or not the analytical solution analyzed by the signal analyzing unit conforms to a predetermined second reference condition;
 wherein when the analytic solution of the signal analyzing unit is determined to conform the second reference condition.

25. A vehicle steering apparatus for operating a steering mechanism for turning a steerable tired-wheel according to an operation of an operating member to be operated by a driver, comprising:
 an actuator for applying a force to the operating member for transmitting information to the driver;
 a load detecting unit for detecting a tire load which is a load to be applied to a tire of the vehicle;
 a steering mechanism system detecting unit for detecting a physical amount applied to the steering mechanism;
 a vehicle condition detecting unit for detecting the physical amount relating to the movement of the vehicle;
 a control unit for controlling the actuator based on a result detected by at least one of the load detecting unit, the steering mechanism system detecting unit, and the vehicle condition detecting unit; and
 a teaching unit for giving a predetermined teaching to a driver based on the result detected by at least one of the load detecting unit, the steering mechanism system detecting unit, and the vehicle condition detecting unit.

* * * * *